United States Patent
Chen et al.

(10) Patent No.: US 7,426,660 B2
(45) Date of Patent: Sep. 16, 2008

(54) METHOD, PROGRAM, AND STORAGE MEDIUM FOR ACQUIRING LOGS

(75) Inventors: Xinxia Chen, Beijing (CN); Jin Han, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 11/022,951

(22) Filed: Dec. 28, 2004

(65) Prior Publication Data

US 2005/0171731 A1    Aug. 4, 2005

(30) Foreign Application Priority Data

Dec. 30, 2003    (CN)    .................... 2003 1 0124566

(51) Int. Cl.
*G06F 11/00*    (2006.01)
(52) U.S. Cl. ...................................... 714/38
(58) Field of Classification Search .................. 714/38, 714/20, 21; 717/127, 128, 130
See application file for complete search history.

(56) References Cited

U.S. PATENT DOCUMENTS 7,086,034 B2 *    8/2006    Mihara .................... 717/124
7,188,279 B2 *    3/2007    Iizuka ..................... 714/38
2006/0085667 A1 *    4/2006    Kubota et al. ............... 714/4

* cited by examiner

*Primary Examiner*—Nadeem Iqbal
(74) *Attorney, Agent, or Firm*—Fitzpatrick, Cella, Harper & Scinto

(57) ABSTRACT

A log acquisition method is provided that allows a processing log of software to readily be acquired and reduces the man-hours needed for analyzing a bug. The method for acquiring a runtime log of a program including at least one function for performing a predetermined process, comprising changing the address of said at least one function to the address of a function for log acquisition, wherein said function for log acquisition comprises: calling said at least one function to cause said predetermined process to be executed, receiving the result of the execution and passing said result to said program; determining whether or not a pointer parameter the type of which is specified in a predetermined manner is defined in a function definition in said program; if yes, recording a memory content pointed to by said pointer parameter as data of the specified data type. The type of the pointer parameter may defined by an index structure, and the determining step includes judging the type of the pointer parameter by referring to the specified member of the index structure. The types of the members of the index structure may be various kinds of unexported functions and various kinds of structures and etc.

22 Claims, 37 Drawing Sheets

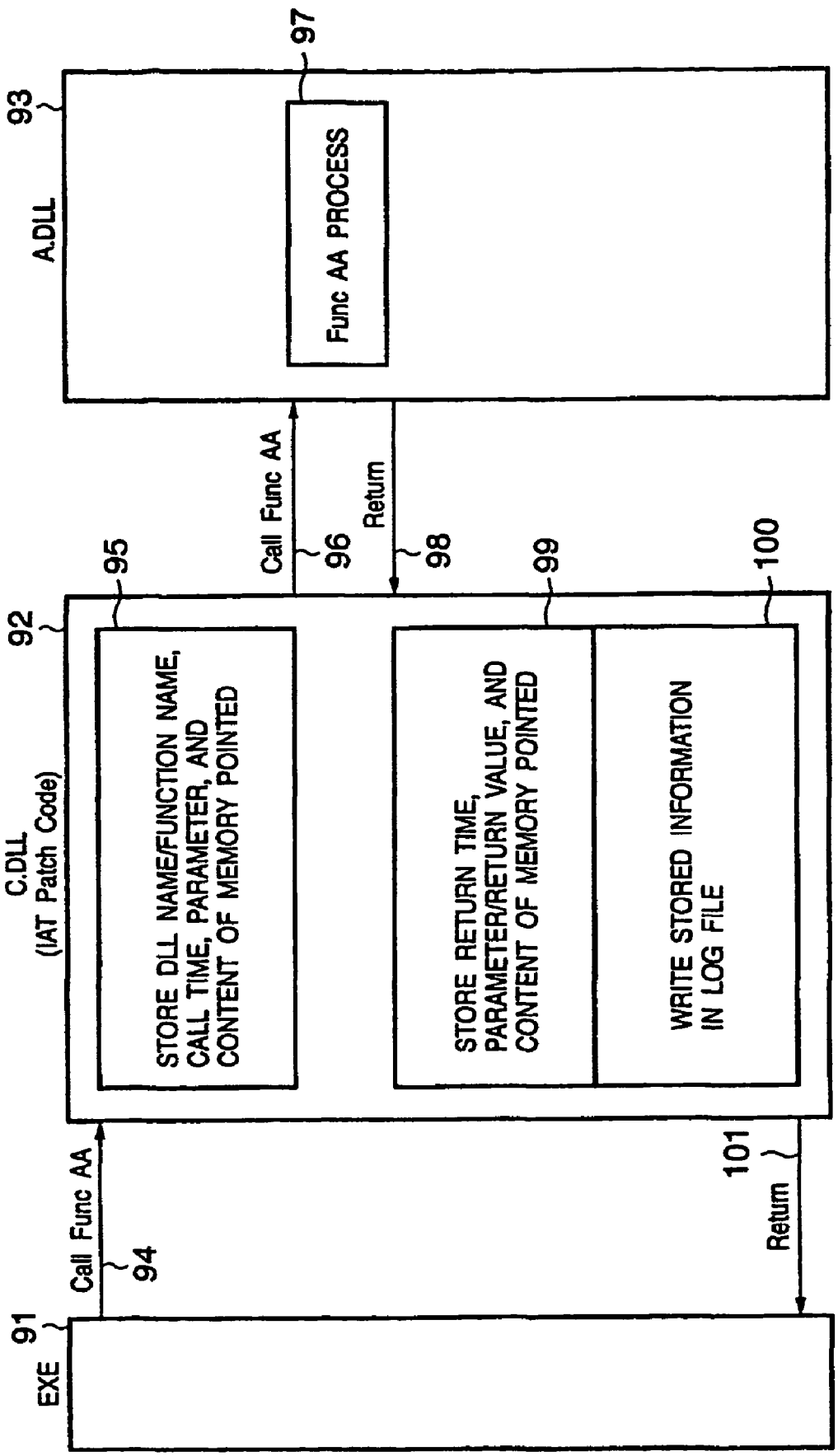

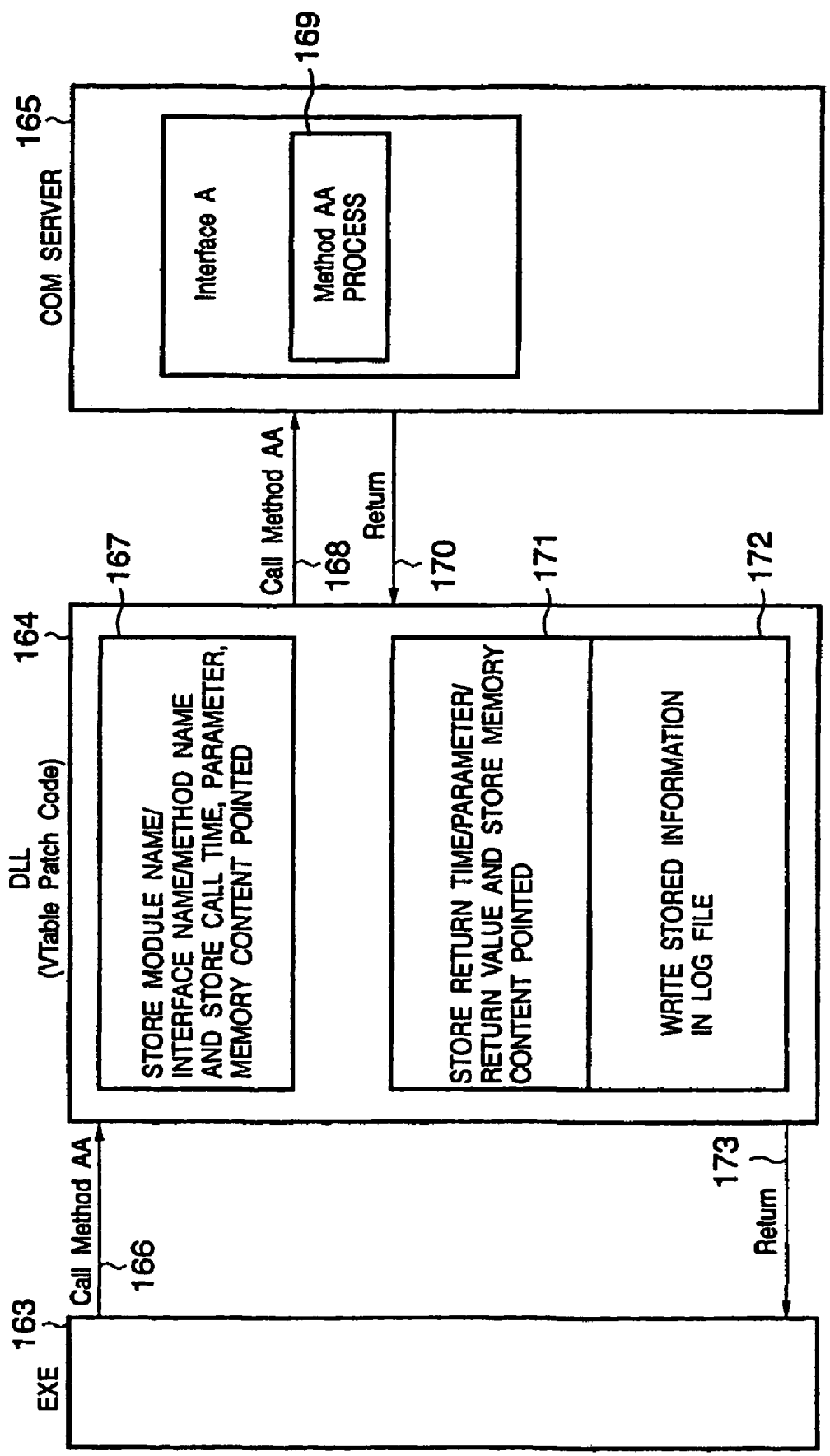

```
void FuncInternal1(int nParam);
void FuncInternal2(char* lpzaParam);
void FuncInternal3(DWORD * dwParam);
void FuncInternal4();

void _stdcall GetFuncPointer ( DWORD dwKind,void *lpBuf)
{
  switch(dwKind)
  {
  case 0:
  //lpBuf being treated as the address of FuncInternal1
  break;
  case 1:
  //lpBuf being treated as the address of FuncInternal2
  break;
  case 2:
  //lpBuf being treated as the address of FuncInternal3
  break;
  case 3:
  //lpBuf being treated as the address of FuncInternal4
  break;
  }
}
```

Fig. 10

```
define PAT_PARAM_ATTR_ID 00000000-0000-0000-00000000000 typedef [public] struct {
DWORD dwType;
[custom(PAT_PARAM_ATTR_ID, "index_is( 0, FuncInternal1)")] BYTE dummy1;
[custom(PAT_PARAM_ATTR_ID, "index_is( 1, FuncInternal2)")] BYTE dummy2;
[custom(PAT_PARAM_ATTR_ID, "index_is( 2, FuncInternal3)")] BYTE dummy3;
[custom(PAT_PARAM_ATTR_ID, "index_is( 3, FuncInternal4)")] BYTE dummy4;
} INDEX_STRUCT;

interface
test
{
   void _stdcall GetFuncPointer (
   [in] DWORD dwKind,
   [in,custom(PAT_PARAM_ATTR_ID, "funckind_is(dwKind,INDEX_STRUCT)")]
   void *lpBuf
   );
   void FuncInternal1( [in] int nParam);
   void FuncInternal2( [in,out] char* lpzaParam);
   void FuncInternal3( [out] DWORD * dwParam);
   void FuncInternal4();
};
```

Fig. 11

| | |
|---|---|
| MODULE NAME: | TestDllStd.DLL |
| FUNCTION NAME: | GetFuncPointer |
| ARGUMENT (in): | DWORD dwKind:0 |
| | FuncInternal1* pBuf: 0x0299103F |
| ARGUMENT (out): | |
| RETURN VALUE: | void: |
| In TIME: | 2002/03/25 22: 24: 12.025 |
| Out TIME: | 2002/03/25 22: 24: 12.035 |
| | |
| MODULE NAME: | TestDllStd.DLL |
| FUNCTION NAME: | FuncInternal1 |
| ARGUMENT (in): | int nParam: 100 |
| ARGUMENT (out): | |
| RETURN VALUE: | void: |
| In TIME: | 2002/03/25 22: 24: 12.036 |
| Out TIME: | 2002/03/25 22: 24: 12.040 |
| | |
| MODULE NAME: | TestDllStd.DLL |
| FUNCTION NAME: | GetFuncPointer |
| ARGUMENT (in): | DWORD dwKind:3 |
| | FuncInternal4* pBuf: 0x029913dF |
| ARGUMENT (out): | |
| RETURN VALUE: | void: |
| In TIME: | 2002/03/25 22: 24: 12.046 |
| Out TIME: | 2002/03/25 22: 24: 12.057 |
| | |
| MODULE NAME: | TestDllStd.DLL |
| FUNCTION NAME: | FuncInternal4 |
| ARGUMENT (in): | |
| ARGUMENT (out): | |
| RETURN VALUE: | void: |
| In TIME: | 2002/03/25 22: 24: 12.060 |
| Out TIME: | 2002/03/25 22: 24: 12.065 |

```
typedef struct {
    char chParam;
    DWORD dwParam;
    short shParam;
} STRUCTKIND1;

typedef struct {
    short shParam;
    DWORD dwParam;
    char chParam;
} STRUCTKIND2;

typedef struct {
    char chParam;
    short shParam;
    DWORD dwParam;
    long lParam;
    int nParam;
} STRUCTKIND3;
void FuncGetData(DWORD dwKind, void* lpBuf)
{
    switch(dwKind)
    {
    case 1:
    //lpBuf being treated as STRUCTKIND1
    break;
    case 2:
    //lpBuf being treated as STRUCTKIND2
    break;
    case 3:
    //lpBuf being treated as STRUCTKIND3
    break;
    }
}
```

Fig. 14

Fig. 15
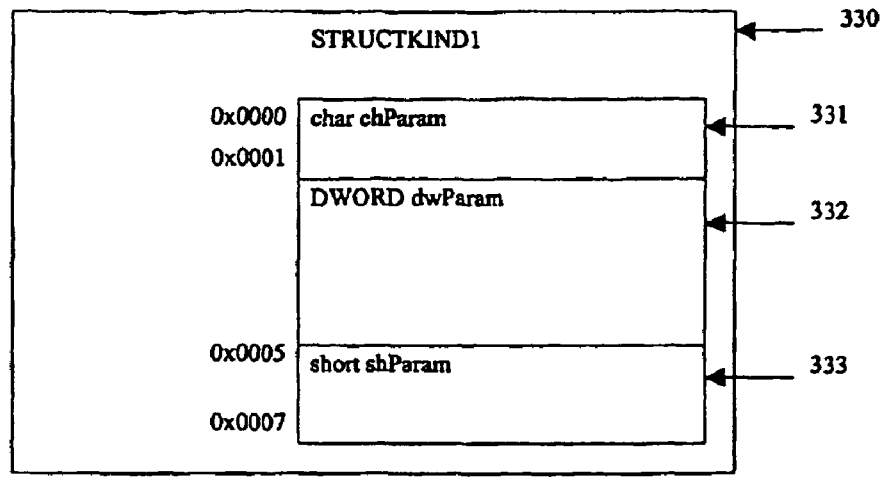
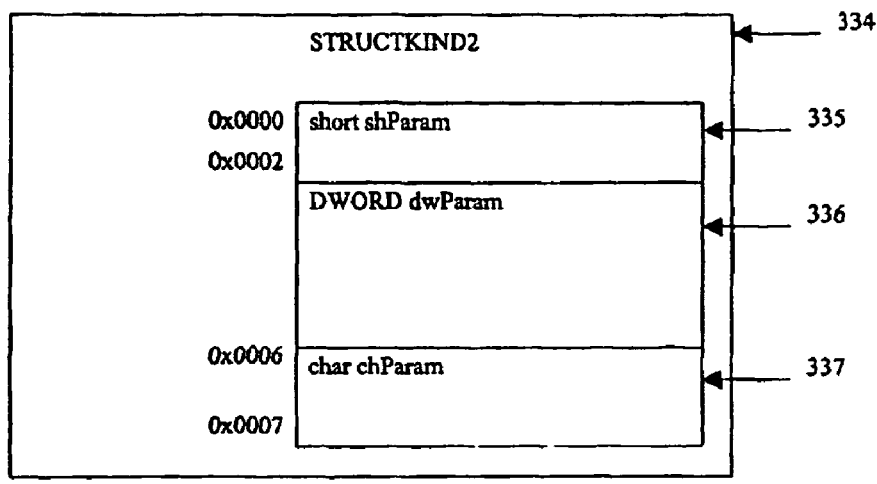
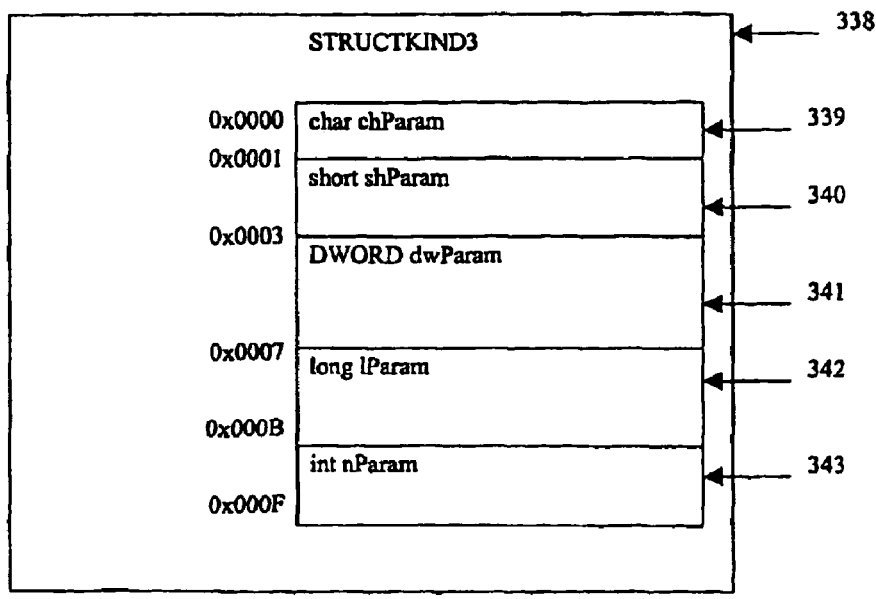

Fig. 16

```
define PAT_PARAM_ATTR_ID 00000000-0000-0000-00000000000
typedef [public] struct {
    char chParam;
    DWORD dwParam;
    short shParam;
} STRUCTKIND1;

typedef [public] struct {
    short shParam;
    DWORD dwParam;
    char chParam;
} STRUCTKIND2;

typedef [public] struct {
    char chParam;
    short shParam;
    DWORD dwParam;
    long lParam;
    int nParam;
} STRUCTKIND3;

typedef [public] struct {
DWORD     dwType;
[custom(PAT_PARAM_ATTR_ID, "Index_is (1, STRUCTKIND1)")]
    BYTE dummy1;
[custom(PAT_PARAM_ATTR_ID, " index_is (2, STRUCTKIND2)")]
    BYTE dummy2;
[custom(PAT_PARAM_ATTR_ID, " index_is (3, STRUCTKIND3)")]
    BYTE dummy3;
} INDEX_STRUCT;

interface
test
{void FuncGetData(
        [in] DWORD dwKind,
        [in,custom(PAT_PARAM_ATTR_ID, "structkind_is(dwKind,INDEX_STRUCT)")]
        void *lpBuf
    );
};
```

Fig. 18

| | |
|---|---|
| MODULE NAME: | TestDllStd.DLL |
| FUNCTION NAME: | FuncGetData |
| ARGUMENT (in): | DWORD dwKind:1 |
| | STRUCTKIND1* pBuf: 0x503860C |
| | char STRUCTKIND1.chParam: 0 |
| | DWORD STRUCTKIND1.dwParam: 0 |
| | short STRUCTKIND1.shParam: 0 |
| ARGUMENT (out): | STRUCTKIND1* pBuf: 0x503860C |
| | char STRUCTKIND1.chParam: 1 |
| | DWORD STRUCTKIND1.dwParam: 2 |
| | short STRUCTKIND1.shParam: 3 |
| RETURN VALUE: | void: |
| In TIME: | 2002/03/25 22: 24: 12.025 |
| Out TIME: | 2002/03/25 22: 24: 12.035 |
| | |
| MODULE NAME: | TestDllStd.DLL |
| FUNCTION NAME: | FuncGetData |
| ARGUMENT (in): | DWORD dwKind:3 |
| | STRUCTKIND3* pBuf: 0x503990C |
| | char STRUCTKIND3.chParam: 0 |
| | DWORD STRUCTKIND3.dwParam: 0 |
| | short STRUCTKIND3.shParam: 0 |
| ARGUMENT (out): | STRUCTKIND3* pBuf: 0x503990C |
| | char STRUCTKIND3.chParam: 10 |
| | DWORD STRUCTKIND3.dwParam: 20 |
| | short STRUCTKIND3.shParam: 30 |
| RETURN VALUE: | void: |
| In TIME: | 2002/03/25 22: 24: 12.046 |
| Out TIME: | 2002/03/25 22: 24: 12.057 |

| | |
|---|---|
| MODULE NAME: | A. DLL |
| FUNCTION NAME: | FuncAA |
| ARGUMENT: | DWORD dwID : Err>100 |
| RETURN VALUE: | DWORD dwRet : Err==0 |

| | |
|---|---|
| MODULE NAME: | A. DLL |
| FUNCTION NAME: | FuncAB |
| ARGUMENT: | DWORD dwHandle : Err==0 |
| RETURN VALUE: | int nRet : Err<=−1 |

| | |
|---|---|
| MODULE NAME: | B. DLL |
| INTERFACE NAME: | InterfaceA |
| METHOD NAME: | MethodAA |
| ARGUMENT: | DWORD dwID : Err>100 |
| RETURN VALUE: | DWORD dwHandle: Err==0 |

| | |
|---|---|
| MODULE NAME: | B. DLL |
| INTERFACE NAME: | InterfaceA |
| METHOD NAME: | MethodAB |
| ARGUMENT: | DWORD dwID : Err<=0 |
| RETURN VALUE: | DWORD dwRet: Err!=0 |

| | |
|---|---|
| MODULE NAME: | B. DLL |
| INTERFACE NAME: | InterfaceB |
| METHOD NAME: | MethodBA |
| ARGUMENT: | DWORD dwID : Err>=0 |
| RETURN VALUE: | DWORD dwRet: Err!=0 |

METHOD, PROGRAM, AND STORAGE MEDIUM FOR ACQUIRING LOGS

This application claims priority from Chinese Patent Application No. 200310124566.7 filed Dec. 30, 2003, which is incorporated hereby by reference.

FIELD OF THE INVENTION

The present invention relates to a technology for acquiring processing logs for software consisting of a plurality of modules.

BACKGROUND OF THE INVENTION

Software failure that does not repeatedly occur has been solved by acquiring and analyzing the processing log of the software to identify the failures.

Processing log acquisition according to such prior-art methods has the following problems:

(1) Software modules must be modified to add a routine for acquiring a process log. Accordingly, the workload for acquiring the process log is heavy.

(2) Processing log acquisition is performed for each module and therefore logs are generated on a module-by-module basis. It is difficult to obtain a chronological log of entire software processing. Consequently, a large number of man-hours are required for analyzing a log to identify the cause of a failure because it does not provide a broad view of the entire processing.

SUMMARY OF THE INVENTION

The present invention has been made to solve the problems described above. An object of the present invention is to provide a method that allows a log of a software program separated into modules to be readily obtained and reduces the number of man-hours needed to analyze the cause of software failure, a program for causing a computer to perform the method, and a storage medium containing the program.

To achieve the object, the present invention provides a log acquisition method for acquiring a runtime log of a program including at least one function for performing a predetermined process, comprising the step of changing the address of said at least one function loaded for performing said predetermined process to the address of a function for log acquisition, wherein said function for log acquisition comprises the steps of:

calling said at least one function for performing said predetermined process to cause said predetermined process to be executed, receiving the result of the execution and passing said result to said program;

determining whether or not a pointer parameter the type of which is specified in a predetermined manner is defined in a function definition in said program; and if a pointer parameter of the type of which is specified in a predetermined manner is defined, recording a memory content pointed to by said pointer parameter as data of the specified data type.

In a preferred embodiment, the type of the pointer parameter is defined by an index structure, and the determining step includes judging the type of the pointer parameter by referring to the specified member of the index structure. The types of the members of the index structure may be various kinds of unexported functions and various kinds of structures.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A shows the process while using the IAT Patch according to the first embodiment;

FIG. 8A shows the process while using the VTable Patch according to the first embodiment;

FIG. 10 shows an example of a function definition according to a second embodiment;

FIG. 11 shows a description written in IDL for acquiring pointer parameter data entities as a log according to the second embodiment;

FIG. 13 shows log data obtained according to the second embodiment;

FIG. 14 shows an example of the functions the parameters of which cannot be obtained with an ordinary function definition according to a third embodiment;

FIG. 15 shows how structures are located in memory;

FIG. 16 shows a description in IDL for acquiring a log of the function parameters shown in FIG. 14 according to the third embodiment;

FIG. 18 shows log data obtained with the definition shown in FIG. 16 according to the third embodiment;

FIG. 24 shows error definitions for functions/methods according to the sixth embodiment;

DETAILED DESCRIPTION OF THE PREFERRED EMBODIMENTS

Preferred embodiments of the present invention will now be described in detail in accordance with the accompanying drawings.

First Embodiment

In a first embodiment, an import function or virtual address table contained in memory, which is an arrangement for calling a function in a module from another module, is used to hook and log function calls between modules, thereby enabling a chronological log of an entire software program to be acquired without any modifications to the software modules. The first embodiment will be described below in detail.

System Configuration

Figure 1:
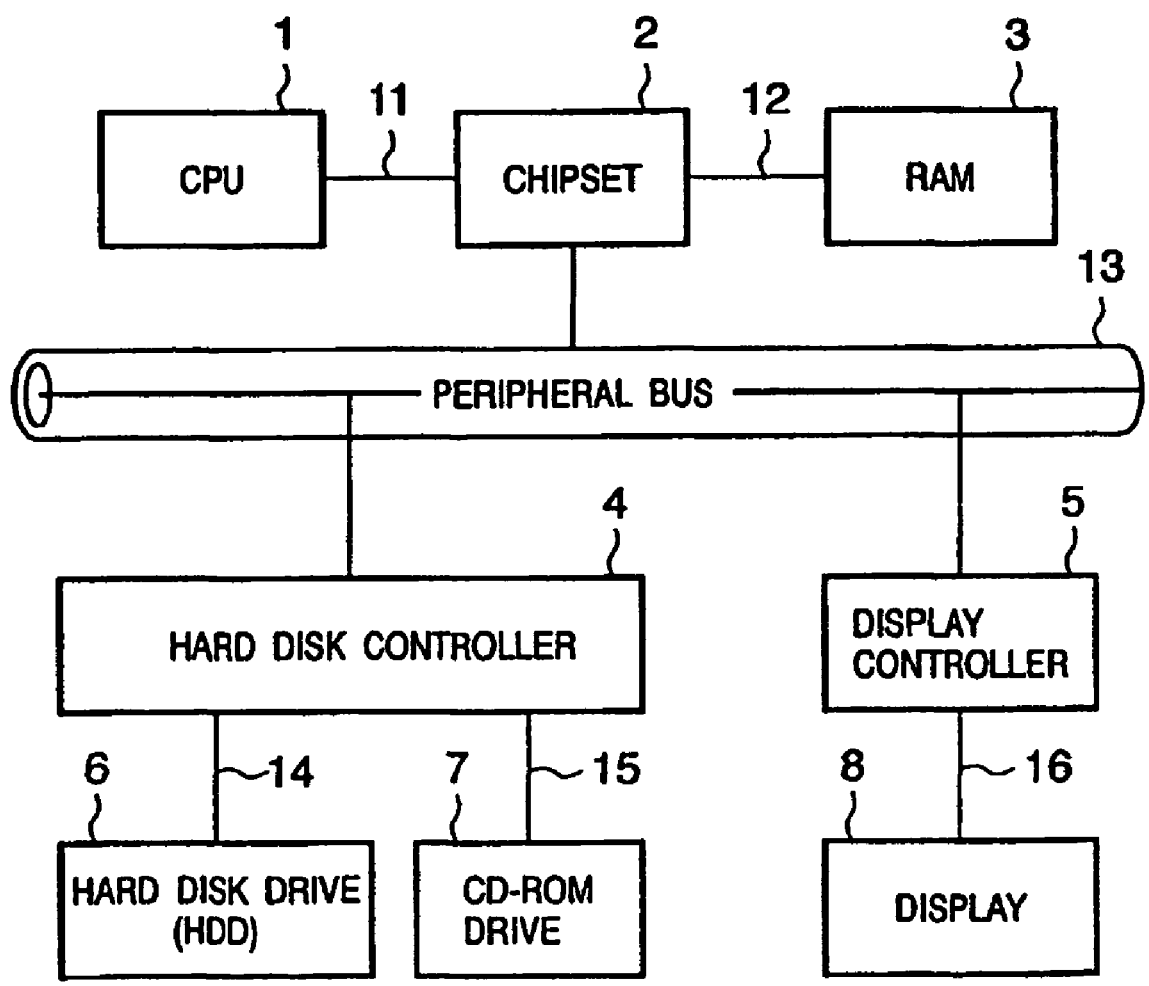
FIG. 1 shows a configuration of a computer (software evaluation system) for implementing a method for acquiring logs according to a first embodiment.

FIG. 1 shows a configuration of a computer (software evaluation system) performing a log acquisition method according to embodiments of the present invention. For simplicity, it is assumed herein that the software evaluation system is built within a single personal computer. However, the features of the log acquisition method of the present invention is effective whether the system is built in a single PC or a plurality of PCs as a network system.

The computer in which the software evaluation system is provided comprises a CPU 1, a chip set 2, a RAM 3, a hard disk controller 4, a display controller 5, a hard disk drive 6, a CD-ROM drive 7, and a display 8.

It also comprises a signal line 11 connecting the CPU 1 with the chip set 2, a signal line 12 connecting the chip set 2 with the RAM 3, a peripheral bus 13 connecting the chip set 2 with peripheral devices, a signal line 14 connecting the hard disk controller 4 with the hard disk drive 6, a signal line 15 connecting the hard disk controller 4 with the CD-ROM drive 7, and a signal line 16 connecting the display controller 5 with the display 8.

Acquisition of Log Concerning Function Process

Figure 2:
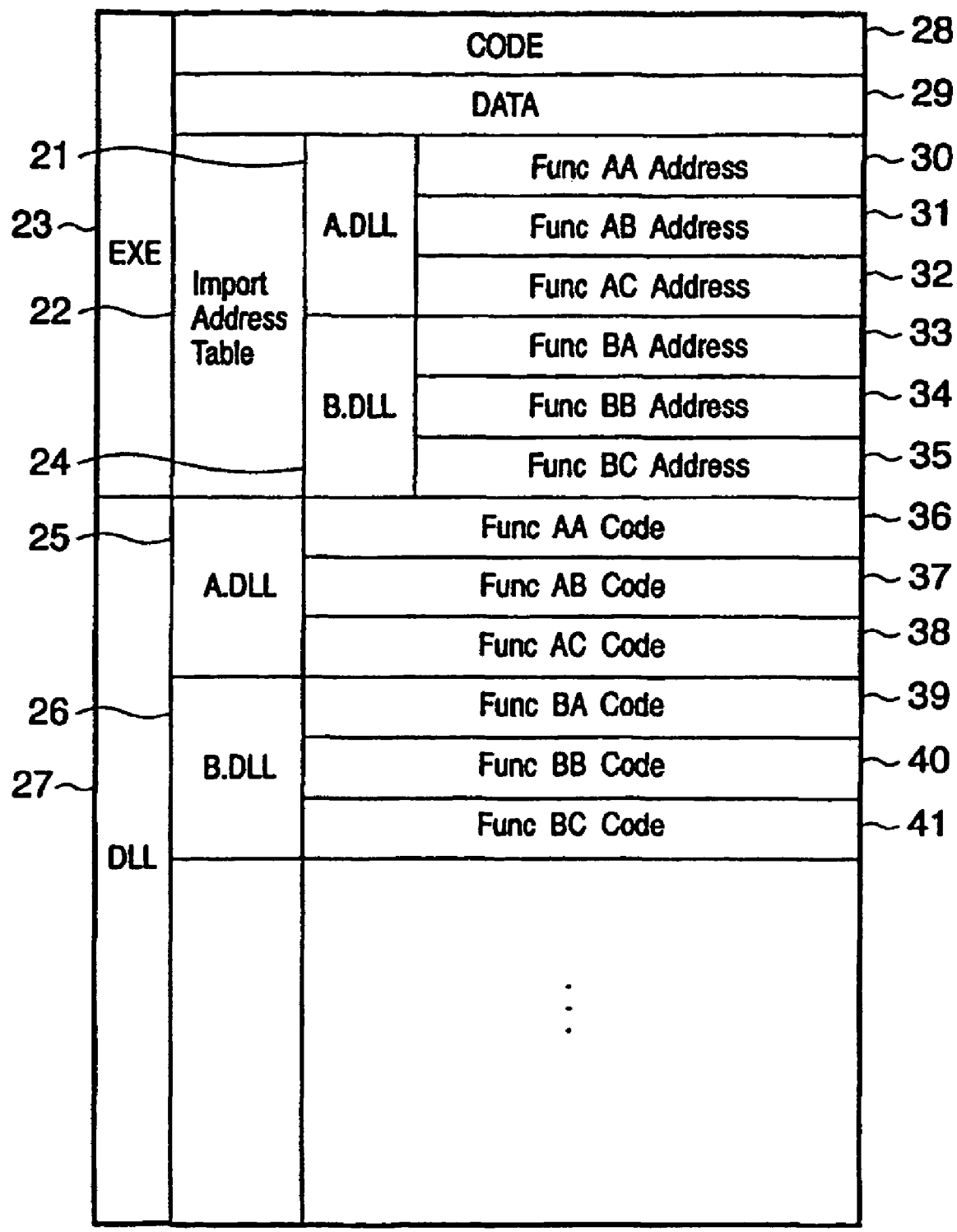
FIG. 2 shows an ordinary organization of memory in which functions are loaded according to the first embodiment.

In order to facilitate the understanding of the software evaluation system that implements the log acquisition method according to the first embodiment of the present invention, how a software program separated into a plurality of modules is ordinarily loaded in a memory will first be described with reference to FIG. 2.

A software program consisting of modules in general is separated into a set of executable files EXE (23) and a set of dynamic link libraries DLL (27) existing as modules and serving as a complement to the EXE. The EXE consists of a code segment (28), a data segment (29), and an import function address table (22). The import function table is further divided into DLLs (21, 24) to which functions belong. Each DLL contains addresses (30 to 35) at which each function is loaded. The contents of the functions of each DLL are separately loaded (25, 26) and each function (36 to 41) is loaded as part of the associated DLL. FIG. 2 shows an example in which one EXE uses the functions in two dynamic link libraries, A.DLL and B.DLL. Six functions, Func AA, Func AB, Func AC, Func BA, Func BB, and Func BC are used.

When a code in a code segment of the EXE calls function Func AA, the address (30) of Func AA written in the import function address table is first read. In effect, the address of AA code (36) read as part of A.DLL is written here. The code of the EXE can call Func AA of A.DLL by calling the address of the AA code (36).

Figure 3:
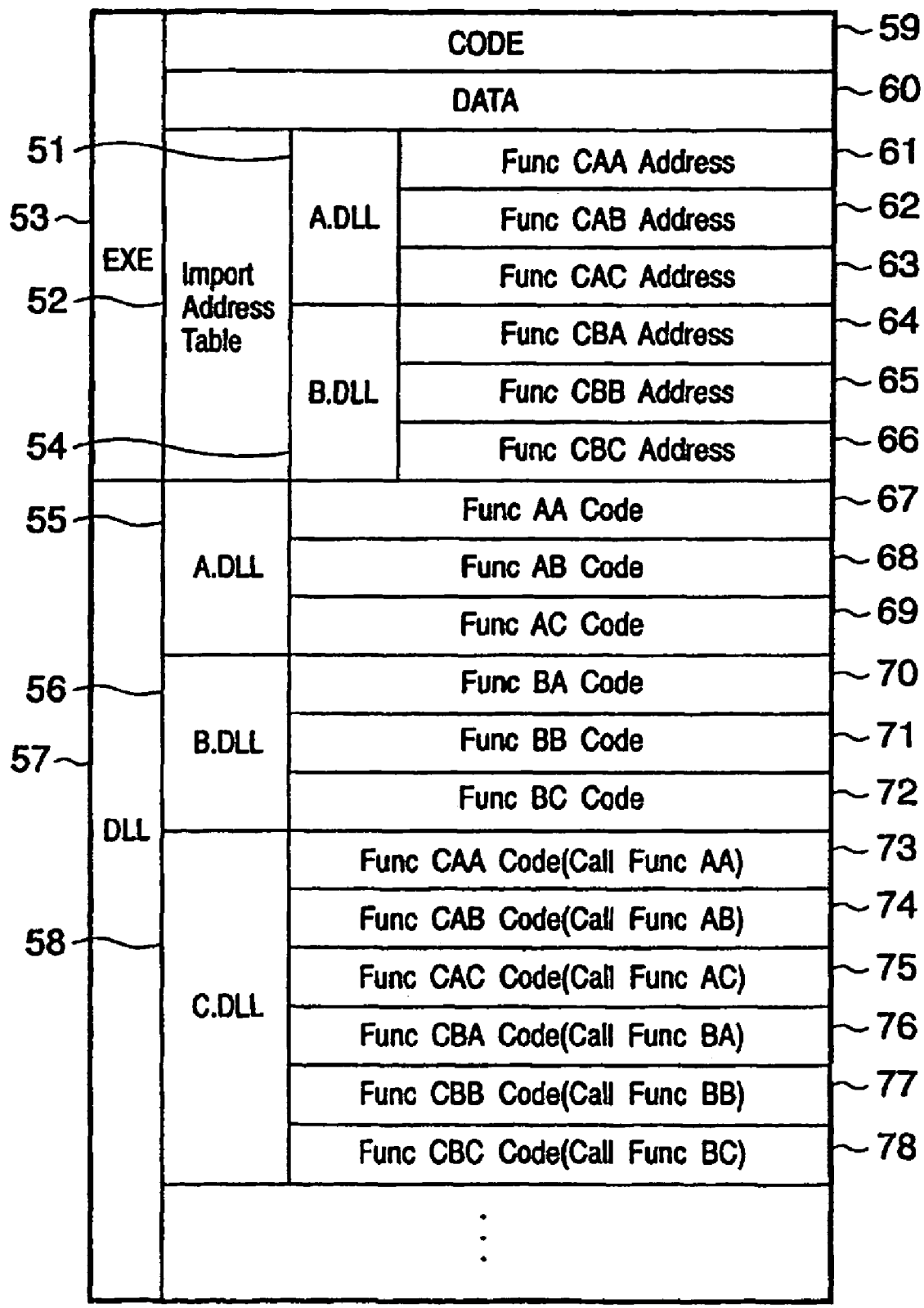
FIG. 3 shows an organization of the memory while using IAT Patch according to the first embodiment.

FIG. 3 shows an organization of the memory according to the first embodiment. This organization differs from the one shown in FIG. 2 in that a technology called IAT Patch (Import Address Table Patch) is used with log acquisition codes to redirect function calls.

When log acquisition is initiated, C.DLL (58), which is a DLL for the IAT Patch is loaded in the memory. C.DLL changes the addresses of functions written in the import function address table (52) to the addresses (61 to 66) of log acquisition codes, Func CAA, Func CAB, Func CAC, Func CBA, Func CBB, and Func CBC, in C.DLL. The codes Func CAA, Func CAB, Func CAC, Func CBA, Func CBB, and Func CBC in C.DLL (73 to 78) perform logging and calls the corresponding functions, Func AA, Func AB, Func AC, Func BA, Func BB, and Func BC (67 to 72) loaded in the memory for responding to the function calls.

Figure 4B:
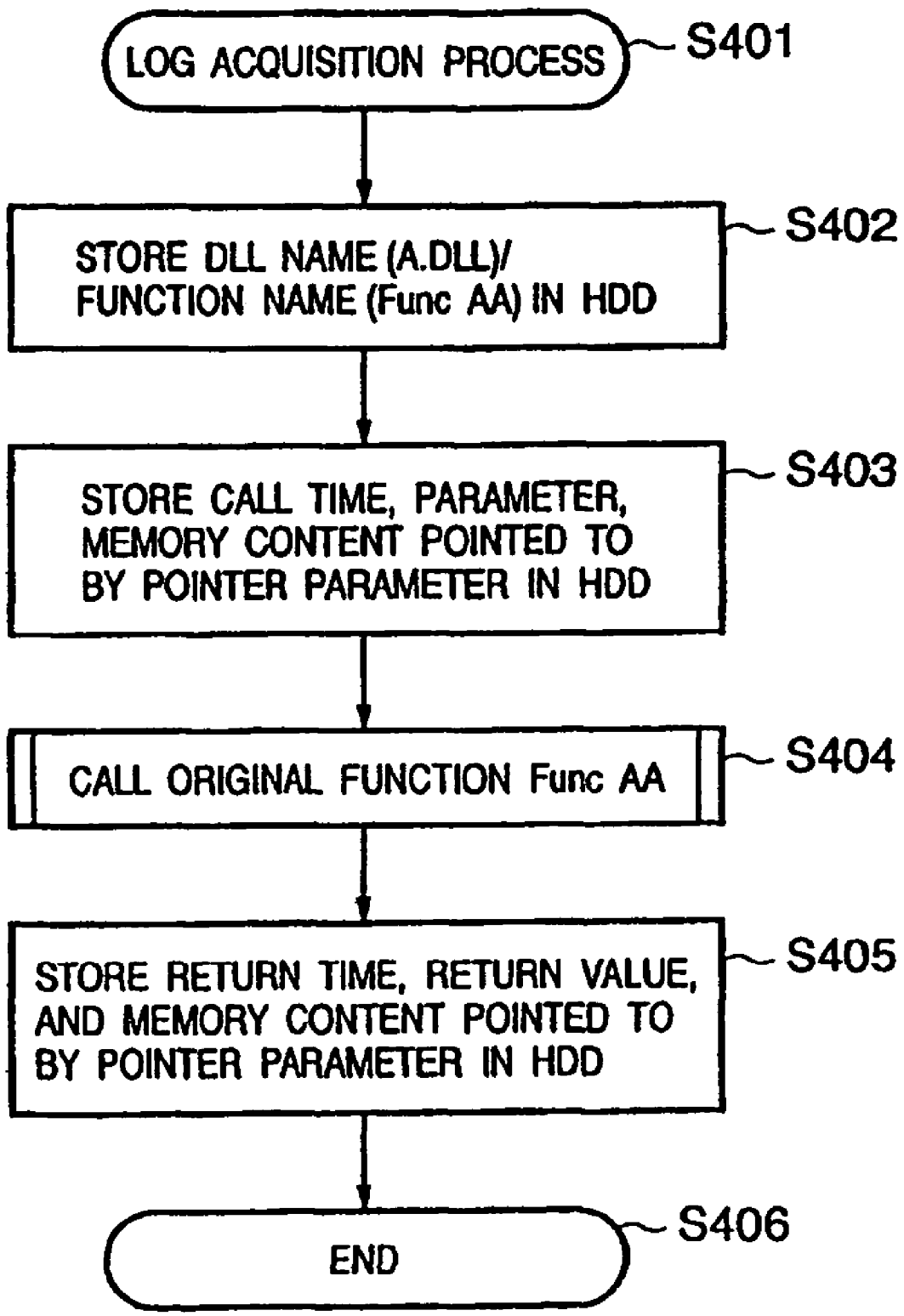
FIG. 4B shows a flowchart of a process for acquiring a log according to the first embodiment.

FIG. 4A shows an IAT Patch process performed in the example shown in FIG. 3. FIG. 4B is a flowchart of a log acquisition process. For simplicity, the figures show how the log acquisition code works with IAT Patch when the EXE calls Func AA in A.DLL.

When the EXE (91) calls Func AA (94), the log acquisition code in C.DLL stores the DLL name/function name (step S402), the call time, and parameter used in the call in the memory and stores the memory content pointed to by a pointer parameter used in the call in another memory (95 and step S403). C.DLL then calls Func AA in A.DLL (93), which is intended to be called (96 and step S404). When the Func AA process (96) in A.DLL ends and control is returned to C.DLL (98), C.DLL stores the return time and return value in memory and stores the memory content pointed to by the pointer parameter in the return in another memory. Then C.DLL writes the log information it has stored into a file (100 and step S405). The control then returns to the EXE as if Func AA in A.DLL was completed in a conventional way (101).

Figure 5:
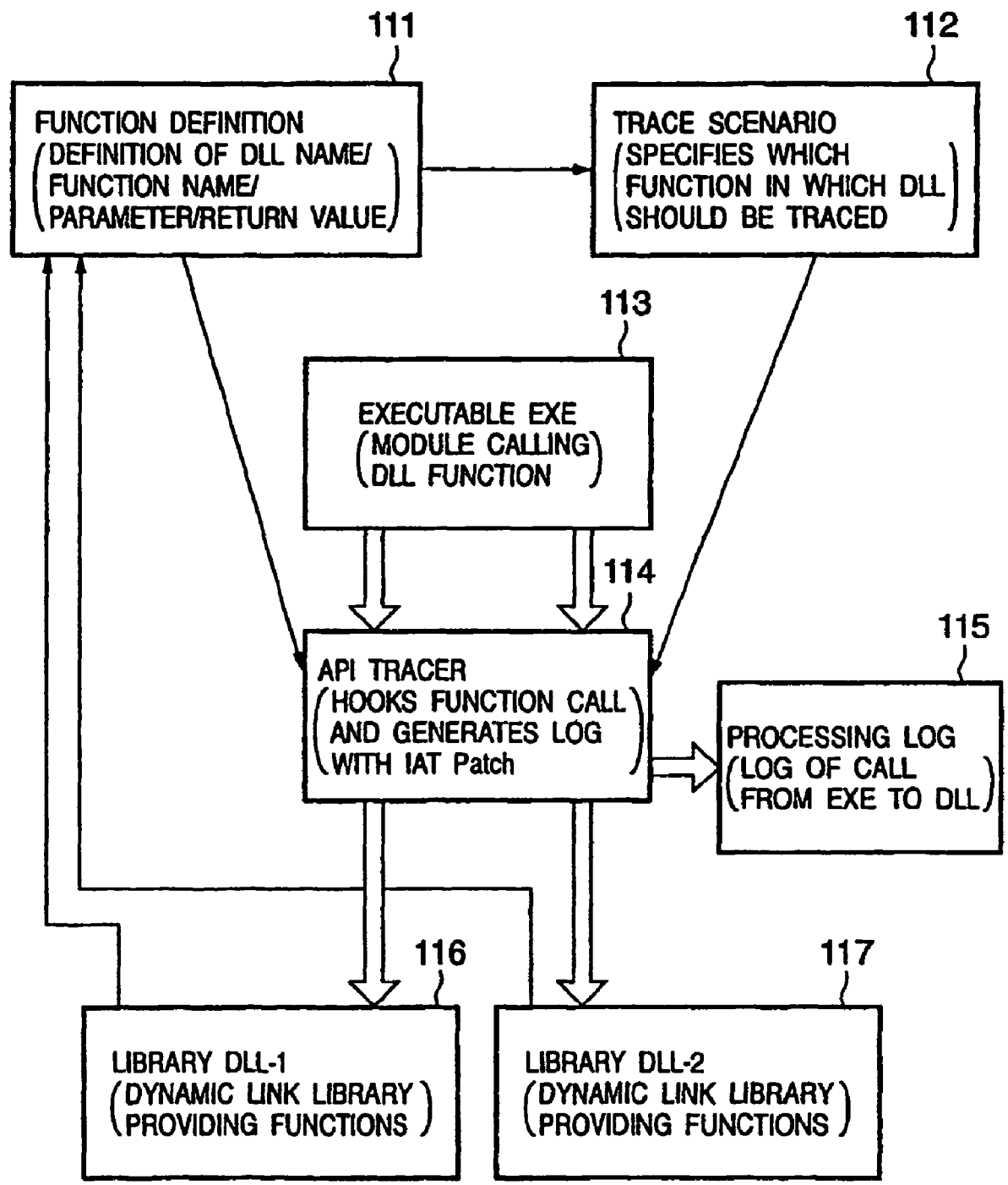
FIG. 5 shows an internal configuration while using the IAT Patch according to the first embodiment.

FIG. 5 shows an internal configuration of the software evaluation system that implements the log acquisition method according to the first embodiment.

Conventionally, an executable EXE (113) calls a function in DLL-1 (116) or DLL-2 (117). In this method, in contrast, a log acquisition code called an API tracer (114) is embedded to generate a processing log (115). The API tracer (114) operates according to a file (111) that describes definitions of functions in DLL-1 or DLL-2 and a setting scenario (trace scenario) that specifies which function in which DLL in an import function table should be rewritten to obtain a log.

Acquisition of Log Concerning Method Process

Described below is how an executable file EXE (113) is loaded in a memory in the software evaluation system implementing the log acquisition method according to the first embodiment when an instance of an interface exported in a COM (Component Object Model) server. In order to explain this, how it is ordinarily loaded will first be described in FIG. 6.

Figure 6:
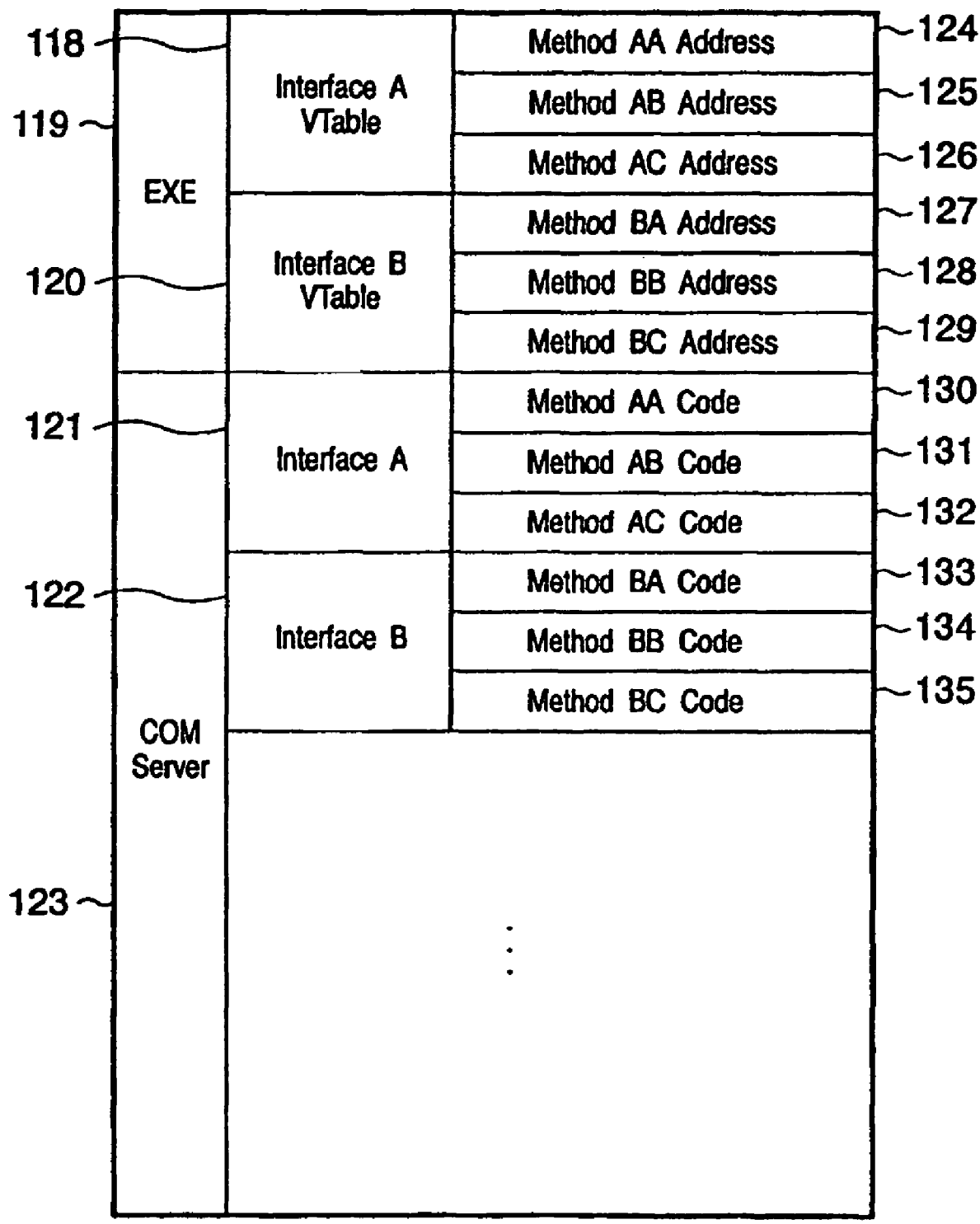
FIG. 6 shows an ordinary memory organization while an instance of COM server interface is generating according to the first embodiment.

When an instance of an interface is generated, the requested interface (121, 122) and its methods (130 to 135), programs describing procedures to be performed by objects in object-oriented programming) are ordinarily generated in the COM server. Both of them are loaded in a memory. A virtual address table (118, 120) is generated for each interface generated and provided to the EXE that has issued the request for generation of the instance. The generated addresses (124 to 129) of methods are contained in the virtual address table. The EXE uses this information to issues a call to each interface. Shown in FIG. 6 is an example in which the EXE (119) generates instances of two interfaces, Interface A (121) and Interface B (122), and uses methods in these interface. Specifically, Method AA, Method AB, Method AC, Method BA, Method BB, and Method BC (130 to 135) are used.

When a code of the EXE calls Method AA, the address (124) of Method AA is first read from the virtual address table. Actually written in the virtual address table is the address of the Method AA code (130) generated as part Interface A in the COM server. The EXE code can call Method AA of Interface A by calling that address.

Figure 7:
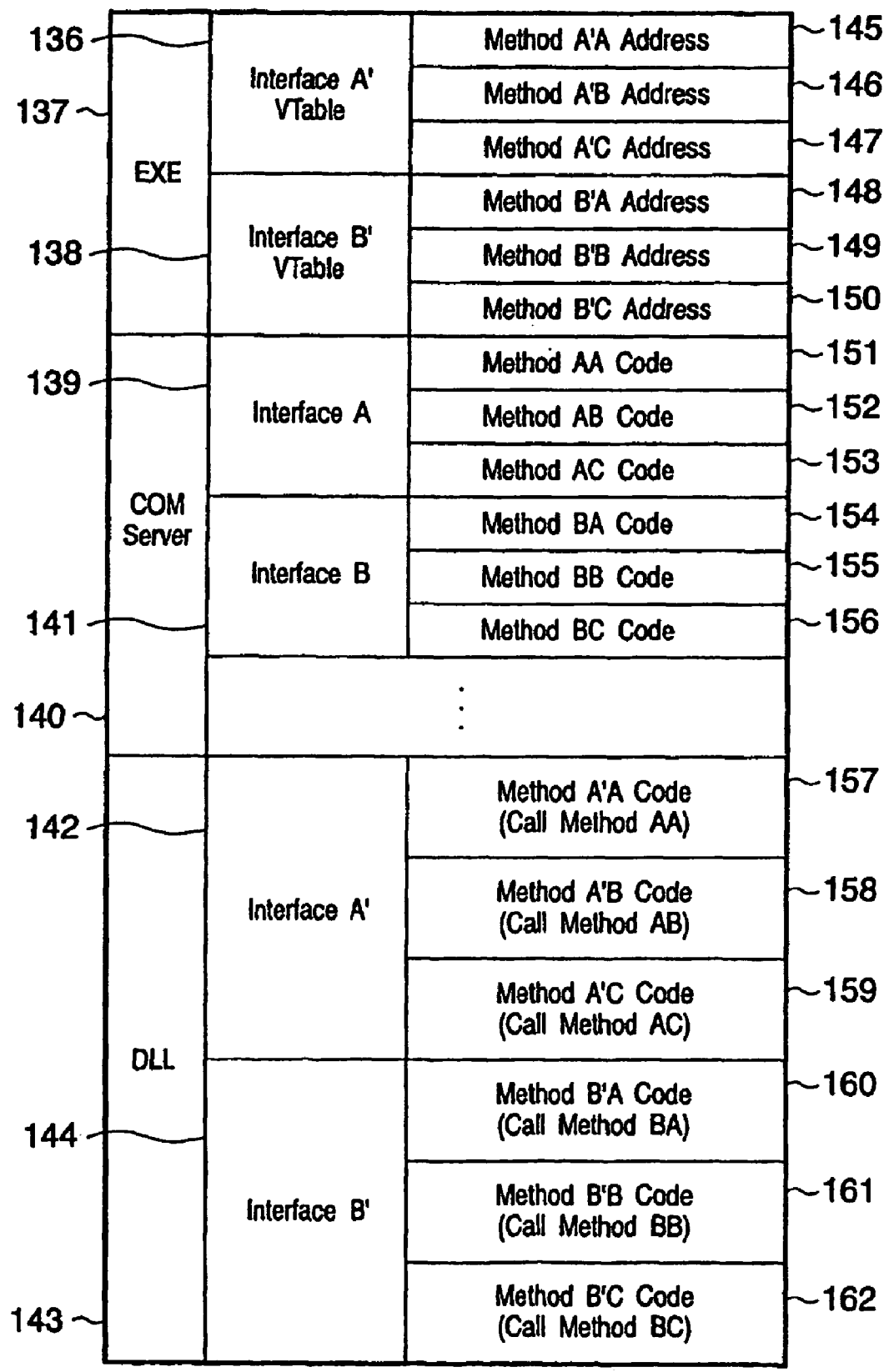
FIG. 7 shows a memory organization according to the first embodiment while using VTable Patch.

FIG. 7 shows an organization of the memory of the software evaluation system according to the first embodiment This organization differs from the one shown in FIG. 6 in that a technique called VTable Patch (virtual address table patch) is used with a log acquisition code to redirect a method call.

When log acquisition is initiated, a DLL (143) for VTable Patch is loaded in the memory. The DLL changes the addresses of the methods contained in the virtual address table (136, 138) to the addresses (145 to 150) of Method A'A, Method A'B, Method A'C, Method B'A, Method B'B, and Method B'C that are log acquisition codes in DLL. The codes Method A'A, Method MB, Method A'C, Method B'A, Method B'B, and Method B'C (157 to 162) in the DLL (143) perform logging and call the corresponding methods, Method AA, Method AB, Method AC, Method BA, Method BB, and Method BC (157 to 162).

Figure 8B:
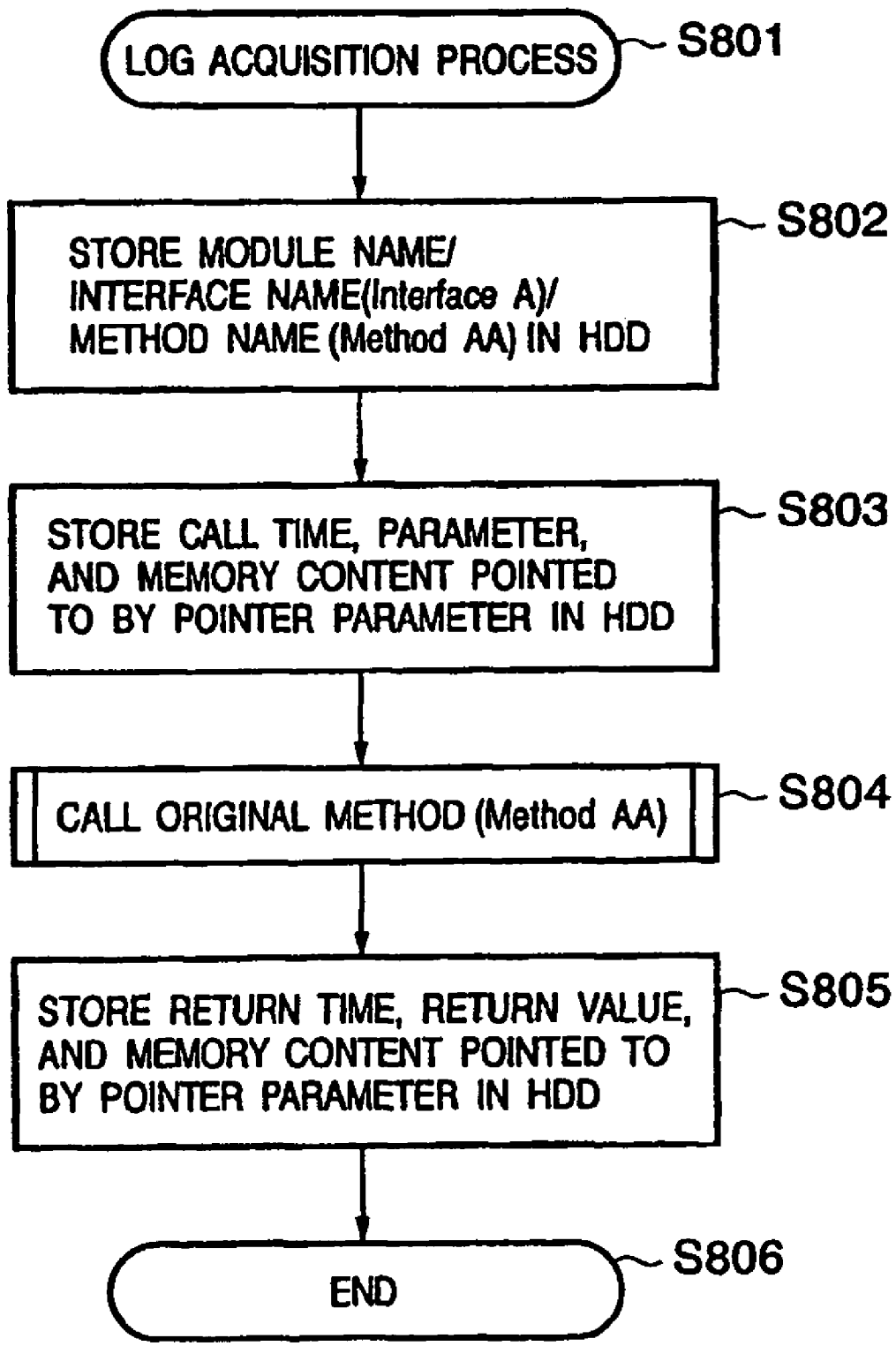
FIG. 8B shows a flowchart of a process for acquiring log according to the first embodiment.

FIG. 8A shows a flowchart of a process of VTable Patch in FIG. 7. FIG. 8B shows a flowchart of a log acquisition process. For simplicity, the figures show how the log acquisition code works with VTable Patch when the EXE calls Method AA in Interface A in the COM server.

When the EXE (163) calls Method AA (166), a log acquisition code in the DLL (164) stores the module name/interface name/method name in the DLL (step S802), the call time, parameters used in the call in memory and stores the memory content pointed to by a pointer parameter in another memory (167 and step S803). The DLL (164) then calls Method AA in the COM server (165) which is intended to be called (168 and step S804). When Method process AA (169) in COM server (165) comes to an end and control returns to the DLL (170), the DLL (164) stores the return time and return value in the memory and the memory content pointed to by the pointer parameter at the return time in another memory (171). The DLL then write the log information it stored in a file (172 and step S805) and returns the control to the EXE (163) as if Method AA in the COM server (165) ended in a conventional way (171).

Figure 9:
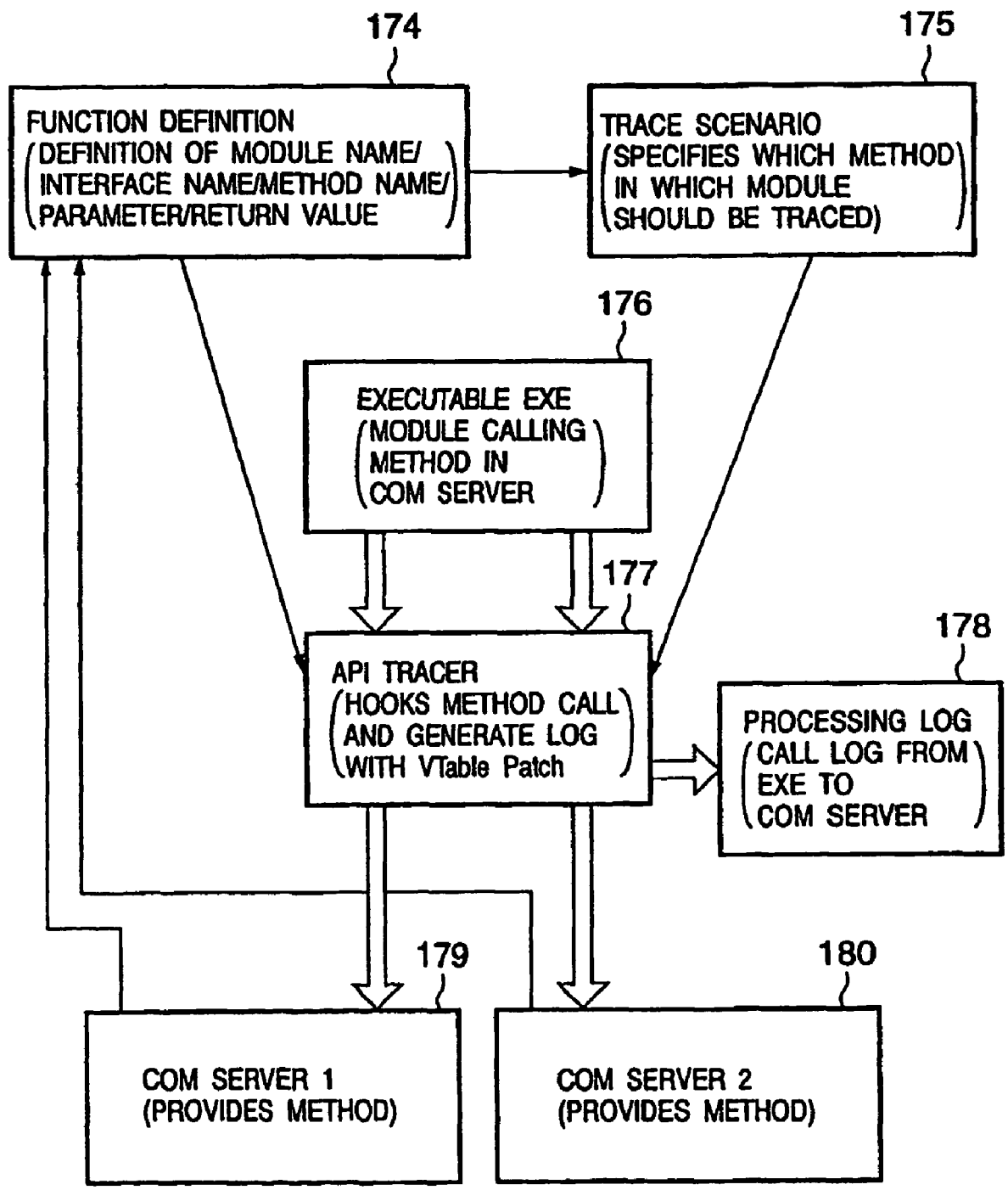
FIG. 9 shows an internal configuration of the software evaluation system according to the first embodiment.

FIG. 9 shows an internal configuration of the software evaluation system according to the first embodiment. Conventionally, an executable EXE (176) calls a method in the COM server 1 (179) or COM server 2 (180). In this method, in contrast, a log acquisition code called an API tracer (177) is embedded to generate a processing log (178). The API tracer (177) operates according to a file (174) that describes definitions of functions in the COM server 1 (179) or COM server 2 (180) and a setting scenario (175) that specifies which method in which interface in which COM server in a virtual address table should be rewritten to obtain a log.

As can be seen from the foregoing description, the log acquisition method according to the present embodiment for acquiring processing logs of software separated into a plurality of modules enables a function/method call provided in a module to be logged without modifying the module itself, thereby reducing workload for obtaining the processing logs. Furthermore, logs generated can be acquired as chronological logs, facilitating analysis of the logs and consequently reducing the number of man-hours needed for identifying the cause of software failure.

Second Embodiment

A second embodiment will be described in which an unexported function such as a callback function is obtained as a log.

FIG. 10 shows an example of the functions that are used in the software evaluation system according to a second embodiment and of which parameters cannot be obtained with a conventional function definition.

As callback functions, four (for example) kinds of callback functions, FuncInternal1, FuncInternal 2, FuncInternal3 and FuncInternal 4 are defined. The first parameter dwKind of the GetFuncPointer function indicates the pointer of one of the four kinds of callback functions that is passed to the second parameter 1pBuf. The GetFuncPointer function treats 1pBuf as the address of FuncInternal1 if the first parameter is 0, or as the address of FuncInternal2 if the first parameter is 1, or as the address of FuncInternal3 if the first parameter is 2, or as the address of FuncInternal4 if the first parameter is 3. If the GetFuncPointer were defined with a conventional function definition, 1pBuf would be a void-type pointer and consequently no data can be obtained.

FIG. 11 shows a description in IDL for acquiring a log of the parameters of the function shown in FIG. 10 in the software evaluation system according to the second embodiment.

The callback functions are defined with a conventional method. Furthermore, an index structure INDEX_STRUCT is defined in the function to be called. Then, in the function for log acquisition, [custom (PAT_PARAM_ID, "funckind_is (dwKind: INDEX_STRUCT)")] is set for the second parameter void*1pBuf of the GetFuncPointer function. This causes the 1pBuf to be treated as the data type of the different members of the index structure depending on the value of the first parameter dwKind, that is, to be treated as the FuncInternal1* data type if the value of the first parameter dwKind is 0, or as FuncInternal 2* if the value is 1, or as FuncInternal 3* if the value is 2, or as FuncInternal 4* if the value is 3, and stored as a log.

Figure 12:
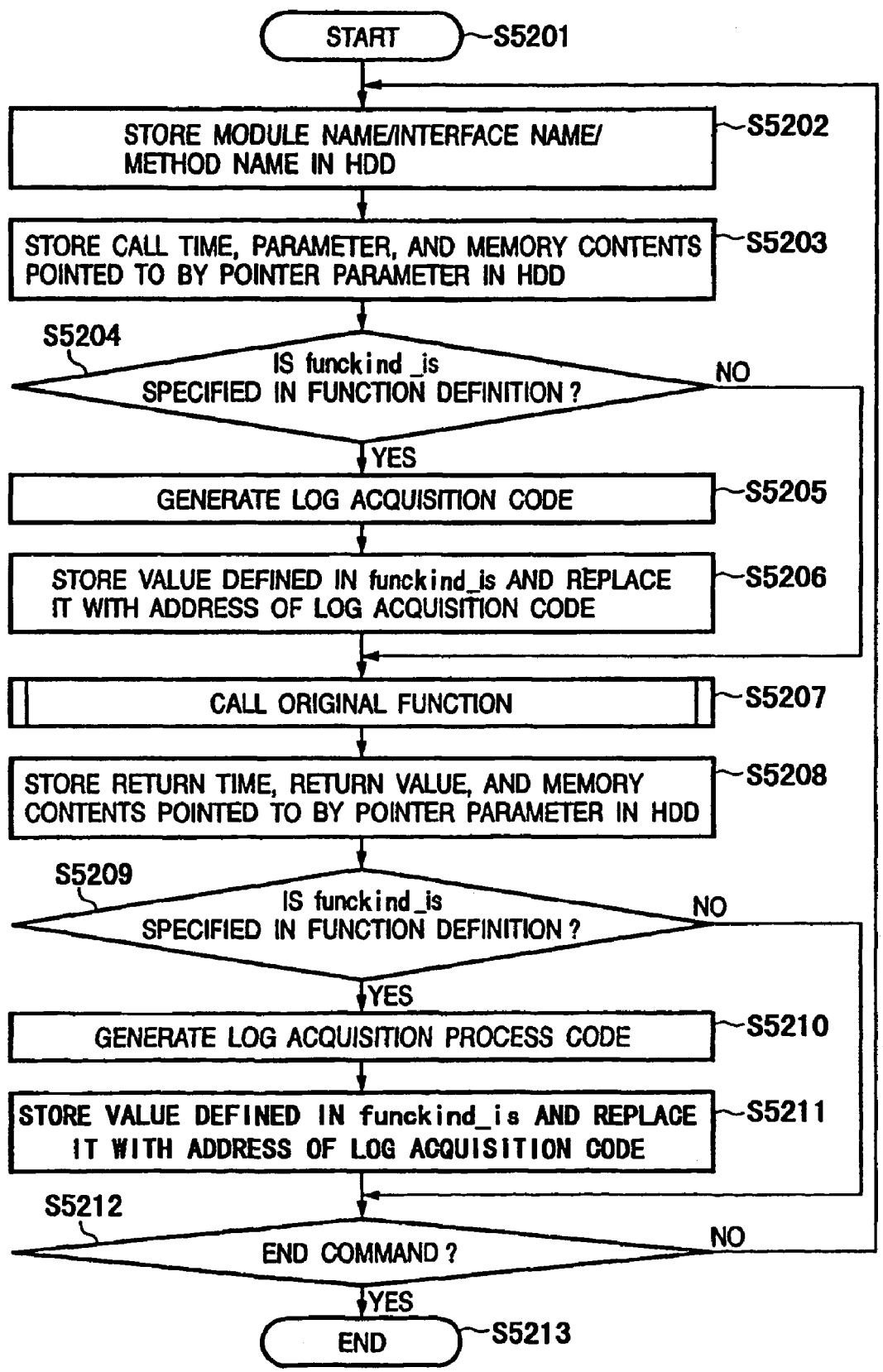
FIG. 12 shows a flowchart of a process for acquiring a log according to the second embodiment.

FIG. 12 shows a flowchart of a process for acquiring a log in the software evaluation system according to the second embodiment when the functions are defined as shown in FIG. 11.

When the process starts (step S5201), the log acquisition is initiated and the module name, interface name, function/method name are stored in the HDD (step S5202). Then the call time, a parameter, and contents pointed to by the pointer parameter are stored in the HDD (step S5203). It is determined whether or not funckind_is is specified in the function definitions (step S5204) and, if so, the function definition defined in funckind_is is obtained from a function definition file and a code for log acquisition is generated according to that definition (step S5205). Then the value defined in funckind_is is stored and replaced with the address of the log acquisition code generated (step S5206).

Then the original function is called (step S5207). If returning from the function, the runtime log acquisition code stores the return time, return value and the memory content pointed to by the pointer parameter in the HDD (step S5208). Then it is determined whether or not funckind specification (funckind_is) is set in the function definition (step S5209). If it is set, the function definition defined in funckind_is is obtained from a function definition file and a code for log acquisition is generated according to that definition (step S5210). Then the value defined in funckind_is is stored and replaced with the address of the log acquisition code generated (step S5211). The process will end when an end command is provided by the user (step S5212).

If the parameter set by funckind—is is replaced with the address of the generated runtime log acquisition code, the original function called with that address is processed in a manner similar to conventional runtime log. That is, the generated runtime log acquisition code calls the unexported function, executes the process and, while transferring the received execution results, stores specified information when calling the unexported function and specified information when receiving the execution results as runtime log.

FIG. 13 shows log data acquired with the definitions shown in FIG. 11 according to the second embodiment. The logs of unexported functions, such as FuncInternal1, FuncInternal4 can be acquired because settings for acquiring the callback functions and unexported internal functions are provided in a function definition file.

Thus, the second embodiment provides the advantage that the logs of unexported functions that cannot be acquired with conventional method can be acquired.

Third Embodiment

FIG. 14 shows an example of the functions that are used in the software evaluation system according to a third embodiment and of which parameters cannot be obtained with a conventional function definition.

Three structures STRUCTKIND1, STRUCTKIND2, and STRUCTKIND3 are defined. The first parameter dwKind of the FuncGetData function should indicate the pointer of one of the three structures that is passed to the second parameter 1pBuf. The FuncGetData function treats 1pBuf as the pointer to STRUCTKIND1 if the first parameter is 1, or as the pointer to STRUCTKIND2 if the first parameter is 2, or as the pointer to STRUICTKIND3 if the first parameter is 3. If the FuncGetData were defined with a conventional function definition, 1pBuf would be a void-type pointer and consequently no data can be obtained.

FIG. 15 shows how memory is used by each of the structures STRUCTKIND1, STRUCTKIND2, and STRUCTKIND3.

The STRUCTKIND1 (330) has a member char chParam (331) at offset 0x0000, DWORD dwParam (332) at 0x0001, and short shParam (333) at 0x0005. The structure STRUCTKIND2 (334) has a member short shParam (335) at offset 0x0000, DWORD dwParam (336) at 0x0002, and char chParam (337) at 0x0006. The structure STRUCTKIND3 (338) has a member char chParam (339) at 0x0000, short shParam (340) at 0x0001, DWORD dwParam (341) at 0x0003, long 1Param (342) at 0x0007, and int nParam at 0x000B.

The structures include no size information and memory organizations for structure data differs from one structure to another. Therefore, the conventional method cannot be used.

FIG. 16 shows a description in IDL for acquiring a log of the parameters of the function shown in FIG. 14 in the software evaluation system according to the third embodiment.

The structures are defined with a conventional method. Furthermore, an index structure INDEX_STRUCT is defined in the function to be called. Then, in the function for log acquisition, [custom (PAT_PARAM_ID, "structkind_is (dwKind: INDEX_STRUCT)") is set for the second parameter void*1pBuf of the FuncGetData function. This causes the 1pBuf to be treated as the data type of the different members of the index structure depending on the value of the first parameter dwKind, that is, to be treated as the STRUCTKIND1* data type if the value of the first parameter dwKind is 1, or as STRUCTKIND2* if the value is 2, or as STRUCTKIND3* if the value is 3 and stored as a log.

Figure 17:
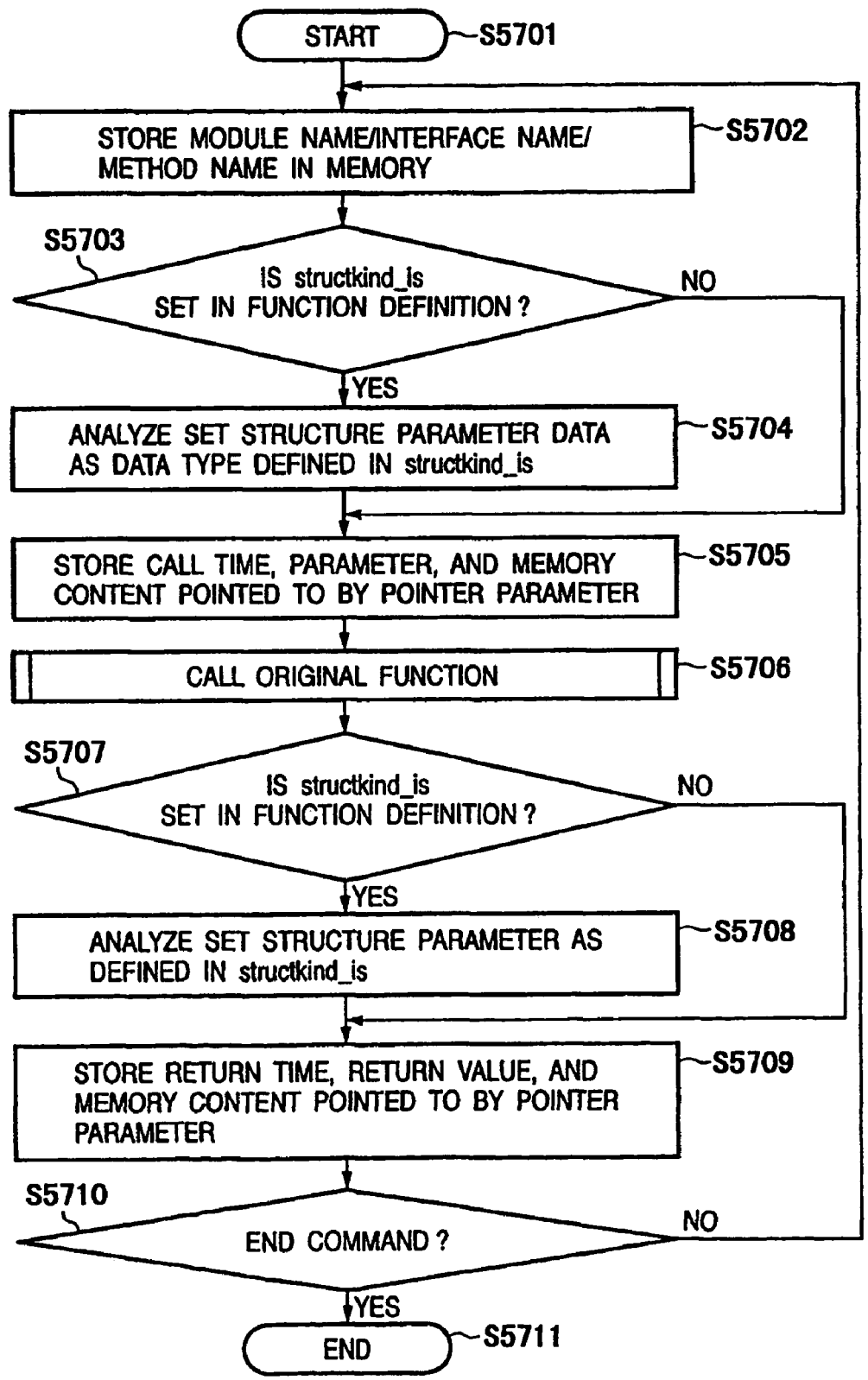
FIG. 17 shows a flowchart of a process for acquiring a log according to the third embodiment.

FIG. 17 shows a flowchart of a process for acquiring a log in the software evaluation system according to the third embodiment when the function is defined as shown in FIG. 16.

When the process starts (step S5701), log acquisition is initiated and the module name, interface name, function/method names are stored in memory (step S5702). Then it is determined whether or not structure type specification (structkind_is) is set in the function definition (step S5703). If it is set, the set structure parameter data is analyzed as the data type defined in the type specification (structkind_is) (step S5704). Then the call time, parameter, and memory content pointed to by a pointer parameter are stored in the memory (step S5705). Then the original function is called (step S5706). After returning from the function, the process determines whether or not structure type specification (structkind_is) is set in the function definition (step S5707). If it is set, the set structure parameter data is analyzed as the data type defined in the type specification (structkind_is) (step S5708). Then the return time, return value, and the memory content pointed to by the pointer parameter is stored in the memory (step S5709). The process will end when an end command is provided by the user (step S5710).

FIG. 18 shows log data acquired with the definitions shown in FIG. 16 according to the third embodiment. Data on the structures that would be void* and only pointers of which would be able to be acquired with an ordinary function definition can be acquired as logs according to the types of the structures used.

Thus, the third embodiment provides the advantage that a log of parameters that cannot be acquired with conventional method can be acquired.

Fourth Embodiment

Figure 19:
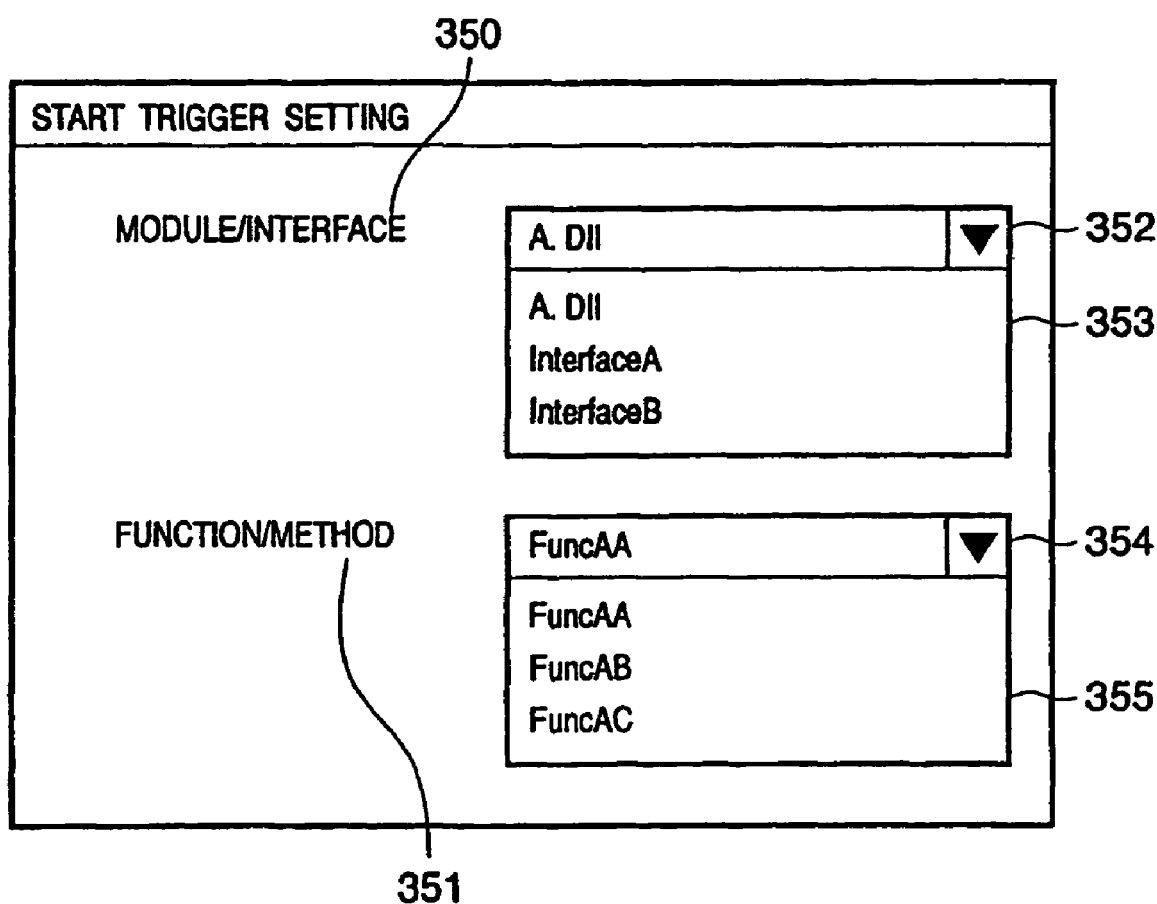
FIG. 19 shows a user interface for setting a function/method initiating a log acquisition process according to a fourth embodiment.

A user interface for making settings for log acquisition and a process performed according to information set through the user interface in a fourth embodiment. FIG. 19 shows a user interface setting functions/methods for initiating log acquisition according to the fourth embodiment.

The user interface includes a dropdown list (352, 353) of modules/interfaces (350) from which a user can select a module/interface the log of which is to be acquired and a dropdown list (354, 355) of functions/methods (351) exported in the selected module/interface, from which the user can select a function/method to be set as a log acquisition trigger.

Figure 20:
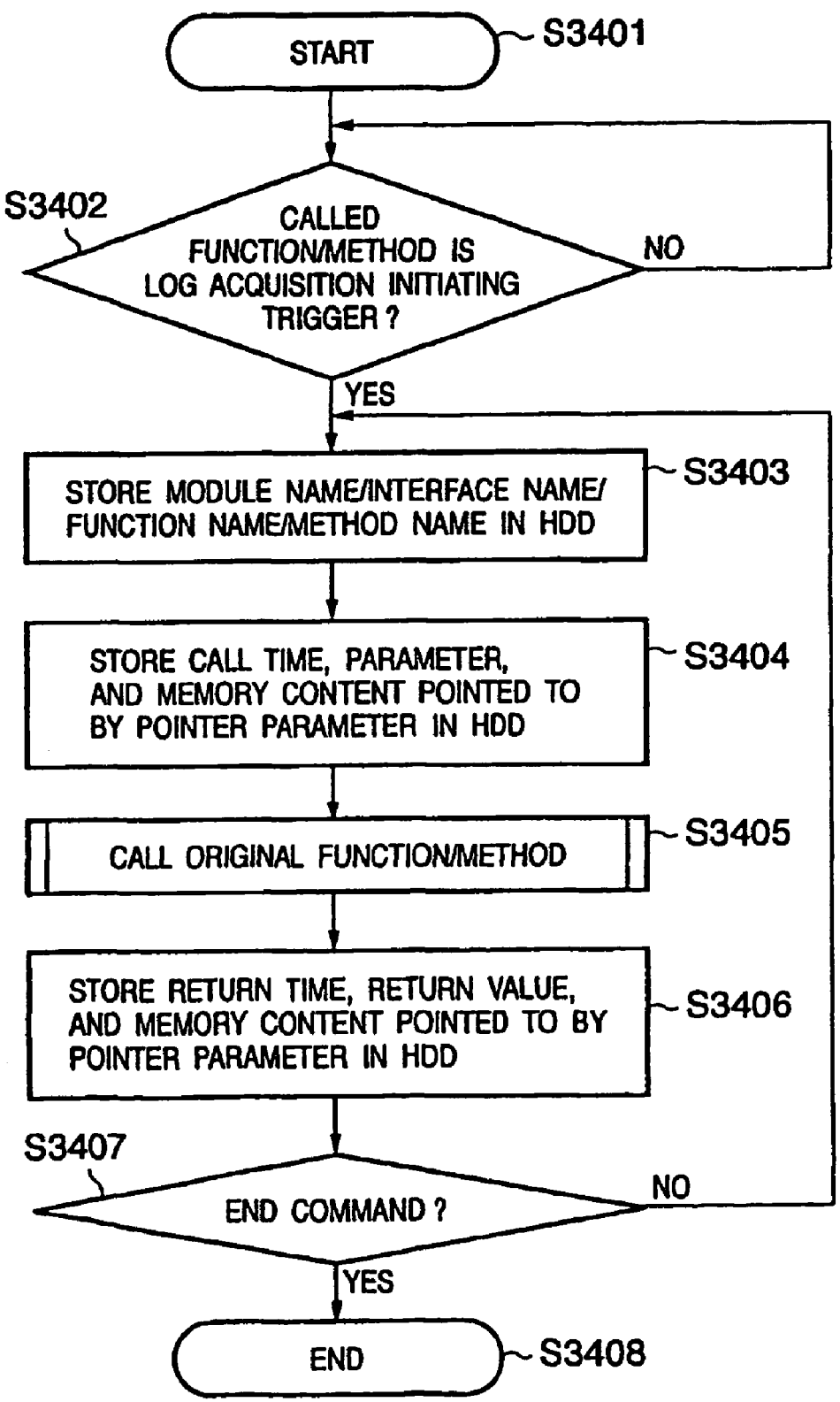
FIG. 20 shows a flowchart of a process for acquiring a log according to the fourth embodiment.

FIG. 20 shows a flowchart of a process for acquiring a log according to settings in the interface shown in FIG. 19 in the software evaluation system according to the fourth embodiment.

When the process is started (step S3401), the log acquisition code determines whether or not a called function/method is set as a log acquisition trigger (step S34 02). If it matches the log acquisition trigger, the code starts log acquisition and stores the module name, interface name, function/method name in the HDD (step S3403). Then the log acquisition code stores the call time, parameter, and the memory content pointed by a pointer parameter in the HDD (step S3404) and calls the original function/method (step S3405). When returning from the function/method, the log acquisition code stores the return time, the return value, and the memory content pointed to by the pointer parameter in the HDD (step S3406). The process continues until an end command is provided by the user (step S3407) without making determination as to the log acquisition initiation trigger.

As can be seen from the forgoing description, the fourth embodiment provides the advantage that it allows the user to select any of functions/methods the log of which is to be acquired, thereby facilitating log analysis.

Fifth Embodiment

While it allows a user to select any function/method the log of which is to be acquired according to the fourth embodiment, it allows the user to select any function/method the log of which is to be stopped will be described in an fifth embodiment.

Figure 21:
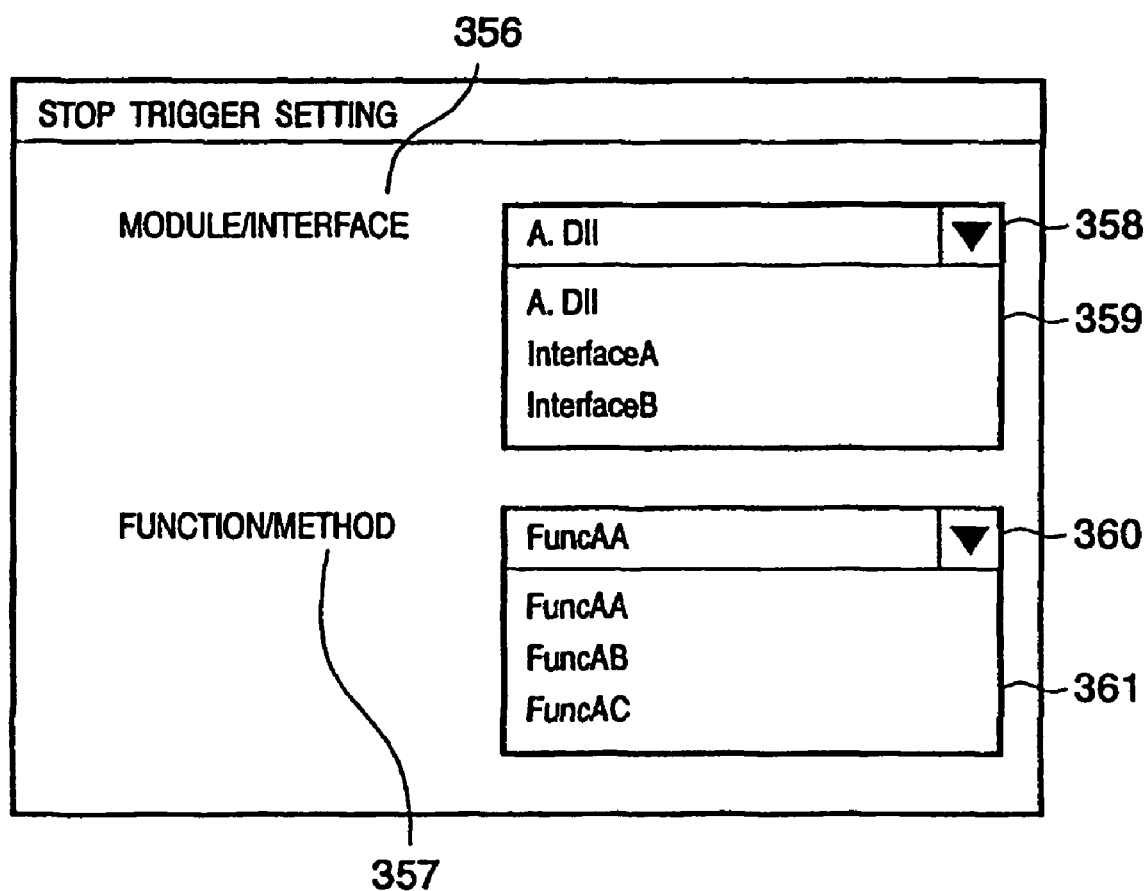
FIG. 21 shows a user interface for setting a function/method stopping log acquisition according to an fifth embodiment.

FIG. 21 shows a user interface for setting a function/method the log of which is to be stopped according to the fifth embodiment.

The user interface includes a dropdown list (358, 359) of modules/interfaces (356) from which a user can select a module/interface the log of which is to be acquired. It also includes a dropdown list (360, 361) of functions/methods (357) exported in the selected module/interface, from which the user can select a function/method to be set as a log acquisition stop trigger.

Figure 22:
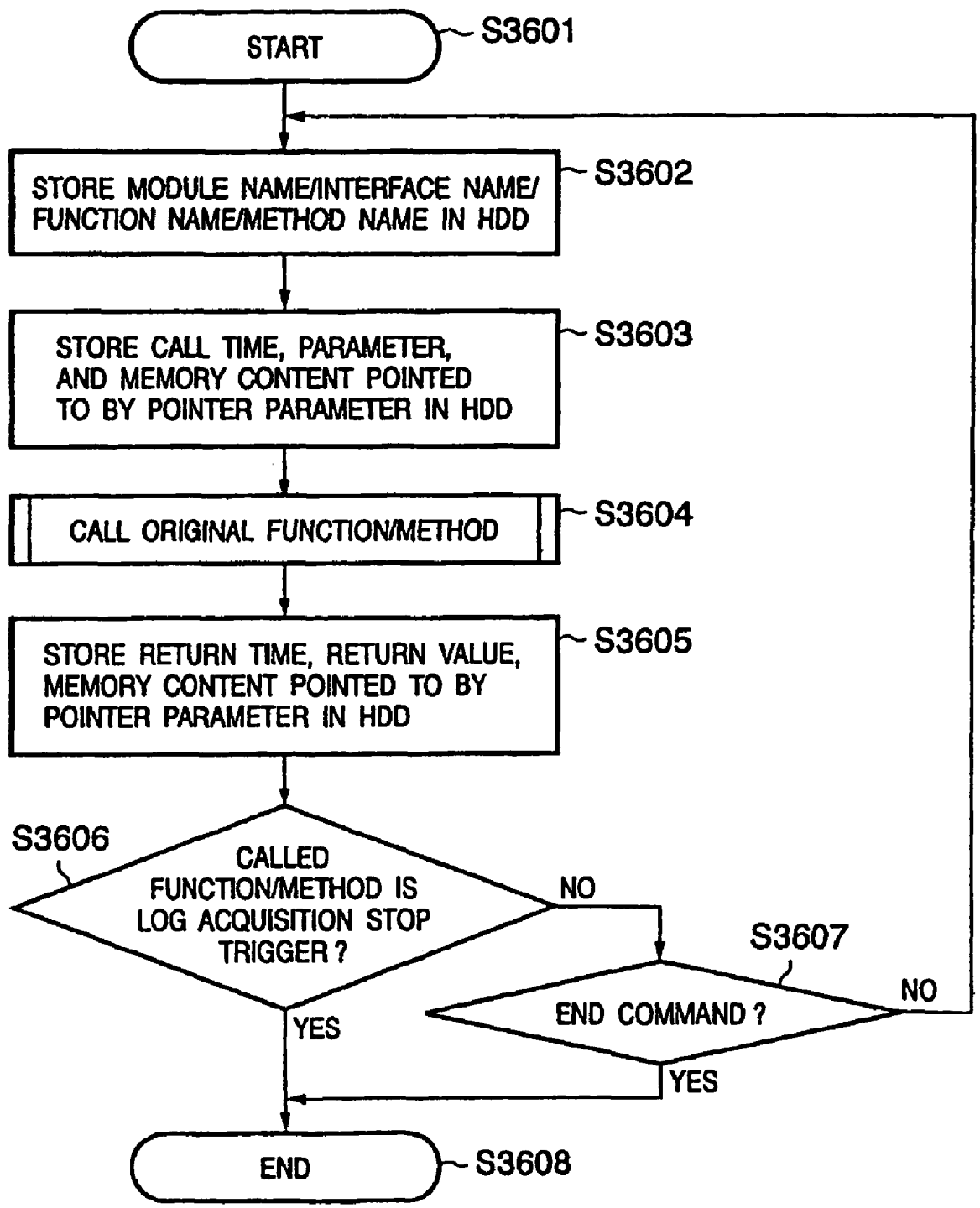
FIG. 22 shows a flowchart of a process for obtaining a log according to the fifth embodiment.

FIG. 22 shows a flowchart of a process for acquiring a log in accordance with settings in the interface shown in FIG. 21 in the software evaluation system according to the fifth embodiment.

When the process is started (step S3601), log acquisition is started and the module name, interface name, function/method name is stored in the HDD (step S3602). The log acquisition code then stores the call time, a parameter, and the memory content pointed to by a pointer parameter in the HDD (step S3603) and calls the original function/method (step S3604). When returning from the function/method, the log acquisition code stores the return time, the return value, and the memory content pointed to by the pointer parameter in the HDD (step S3605). Then it determines whether or not the called function/method is set as a log acquisition stop trigger (step S3606). If it matches the log acquisition stop trigger, the log acquisition process end (step S3607). If it does not match the log acquisition stop trigger, the process will end in response to an end command from the user (step S3606). Thus, the fifth embodiment provides the advantage that the user can stop acquisition of the log of any set function/method and acquire only the log that the user wants to, thereby facilitating log analysis.

Sixth Embodiment

While the user interfaces described with respect to the fourth and fifth embodiments allow the user to select a function/method to start/stop acquisition of its log, log acquisition may be started/stopped only if any function/method selected by the user is terminated by an error.

Figure 23:
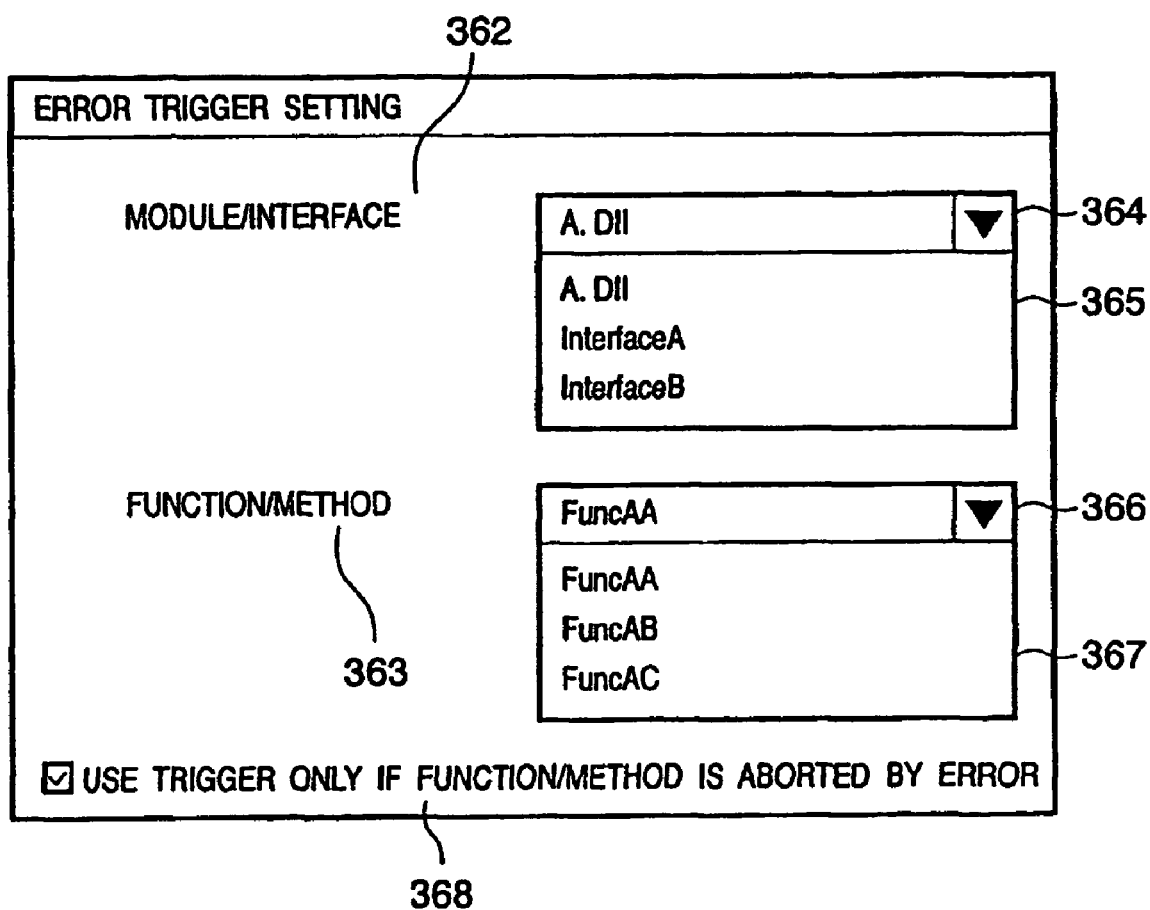
FIG. 23 shows a user interface to which a setting is added for using a trigger function in the event of abnormal end according to a sixth embodiment.

FIG. 23 shows a log acquisition start/stop user interface having an option added for using the trigger function (log acquisition start/stop function) only if the function/method is terminated by an error according to a sixth embodiment. This user interface can be applied to both interfaces shown in FIGS. 19 and 21.

The user interface includes a dropdown list (364, 365) of modules/interfaces (362) whose log can be acquired and from which a user can select a module/interface to set, a dropdown list (366, 367) of functions/methods (363) exported in the selected module/interface from which the user can select a function/method to set, and a check box (368) for activating a trigger function only if the—function/method is terminated by an error.

FIG. 24 shows error definitions for functions/methods according to the sixth embodiment. The error definitions in the present embodiment take the form of files. Each file contains a parameter and return value of each function/method and its defined error condition.

Figure 25:
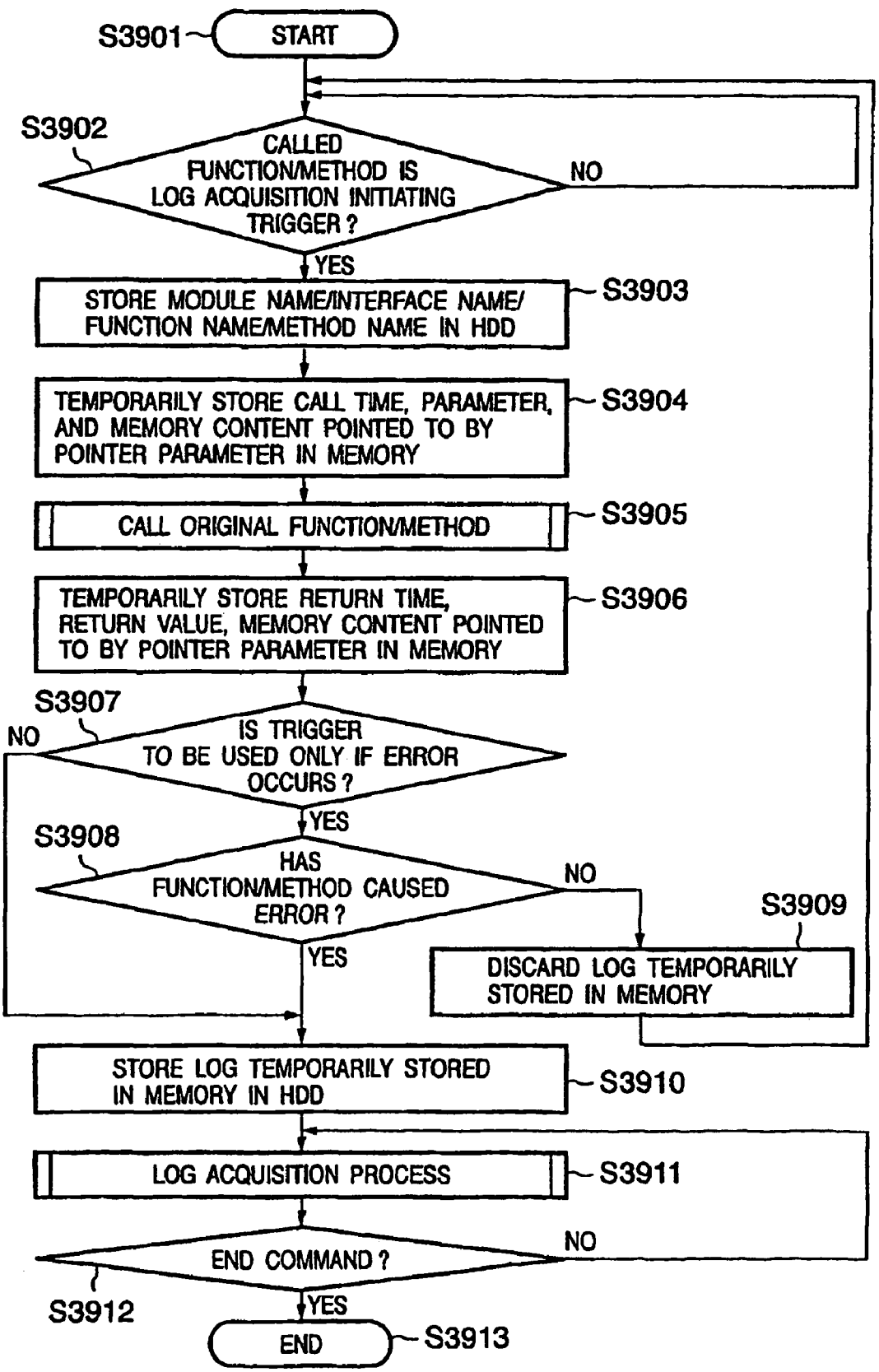
FIG. 25 shows a flowchart of a process for obtaining a log according to the sixth embodiment.

FIG. 25 shows a flowchart of a process for acquiring a log in the software evaluation system according to the present embodiment. In this process, the function of using a trigger only when a log acquisition starts and an error occurs is specified in accordance with settings made in the interface shown in FIG. 23.

When the process is started (step S3901), the log acquisition code determines whether or not a function/method is set as a log acquisition trigger (step S3902). If it is set as the log acquisition initiation trigger, the log acquisition code temporarily stores the module name, interface name, function/method name in memory (step S3903).

The log acquisition code then temporarily stores the call time, a parameter, and the memory content pointed to by a pointer parameter in memory (step S3904) and calls the original function/method (step S3905). After returning from the method, the log acquisition code temporarily stores the return time, a return value, and a content pointed to by the pointer parameter in memory (step S3906).

Then the log acquisition code determines whether or not the log acquisition initiation trigger should be used only if an error occurs (step S3907) and, if so, determines whether or not the function/method has resulted in an error (step S3908). If no error has occurred, the log acquisition code discards the log it has temporarily stored in the memory (step S3909) and returns to the top of the process. On the other hand, if the function/method has resulted in an error, the code stores the log it has temporarily stored in the memory into the HDD (step S3910) and continues the ordinary log acquisition process (step S3911). The process continues until an end command is provided from the user (step S3912).

Figure 26:
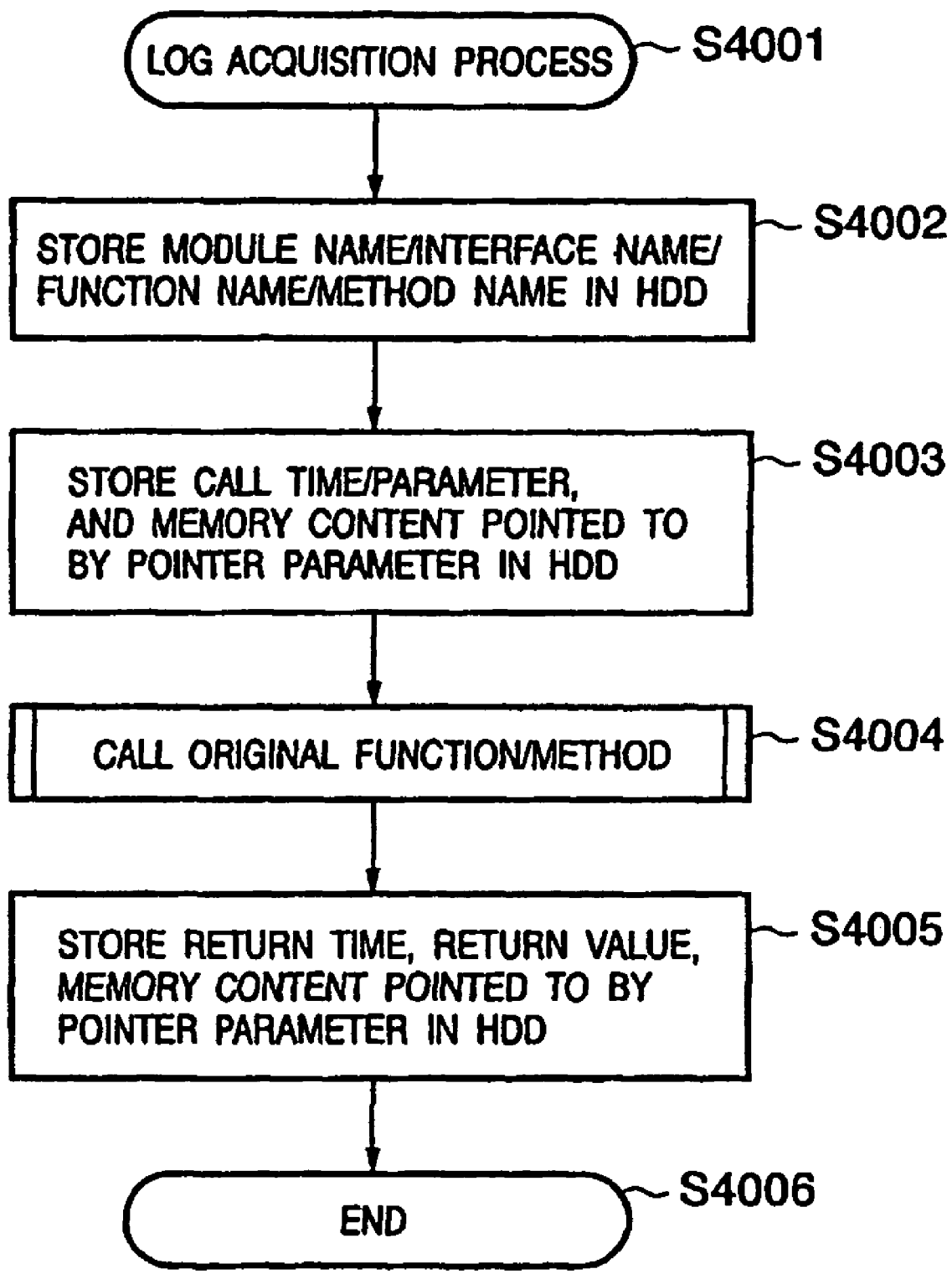
FIG. 26 is a flowchart showing details of the ordinary log acquisition process according to the sixth embodiment.

FIG. 26 shows details of the ordinary log acquisition process shown at step S3911 in FIG. 25.

When the process is started (step S4001), log acquisition starts and the module name, interface name, function/method name is stored in the HDD (step S4002).

Then the log acquisition code stores the call time, a parameter, and the memory content pointed to by a pointer parameter in the HDD (step 34003) and calls the original function/method (step S4004). After returning from the function/method, the log acquisition code stores the return time, return value, and memory content pointed to by the pointer parameter in the HDD (step S4005).

Figure 27:
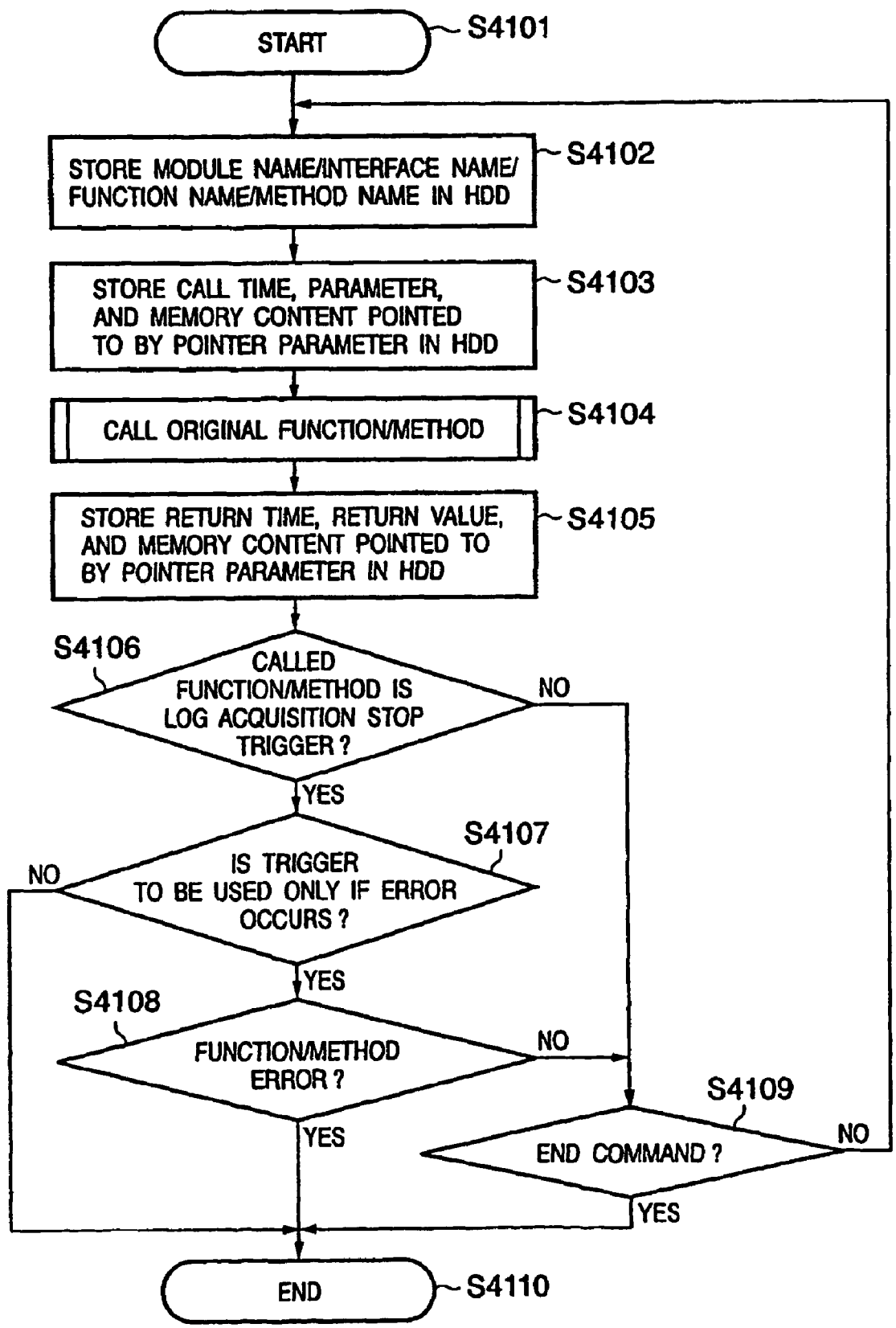
FIG. 27 shows a flowchart of a process for obtaining a log according to the sixth embodiment.

FIG. 27 shows a flowchart of a process for obtaining a log in the software evaluation system according to the present embodiment. In this process, the function of using a trigger only when a log acquisition stops and an error occurs is specified in accordance with settings in the interface shown in FIG. 27.

When the process is started (step S4101), log acquisition is started and the module name, interface name, function/method name are stored in the HDD (step S4102). The log acquisition code stores the call time, a parameter, and the memory content pointed to by a pointer parameter in the HDD (step S4103) and calls the original function/method (step S4104). After returning from the function/method, the log acquisition code stores the return time, return value, and memory content pointed to by the pointer parameter in the HDD (step S4105). It then determines whether or not the called function/method is set as a log acquisition stop trigger (step S4106). If it matches the log acquisition stop trigger, it determines whether or not the log acquisition stop trigger should be used only if an error occurs (step S4107) and, if so, it determines whether or not the function/method has resulted in an error (step S4108). If it has resulted in an error, the log acquisition process ends (step S4109). The process also ends when an end command is provided by the user (step S4110).

Thus, the sixth embodiment provides the advantage that log acquisition can be started or stopped when an error occurs in a given function/method and the user can acquired the log that the user wants to obtain, thereby facilitating log analysis.

Seventh Embodiment

While selectable functions/methods are arranged in a predetermined order in the user interfaces in the fourth to sixth embodiments, they may be displayed in a tree view that allows a user to readily determine the relationships among interfaces and methods.

Figure 28:
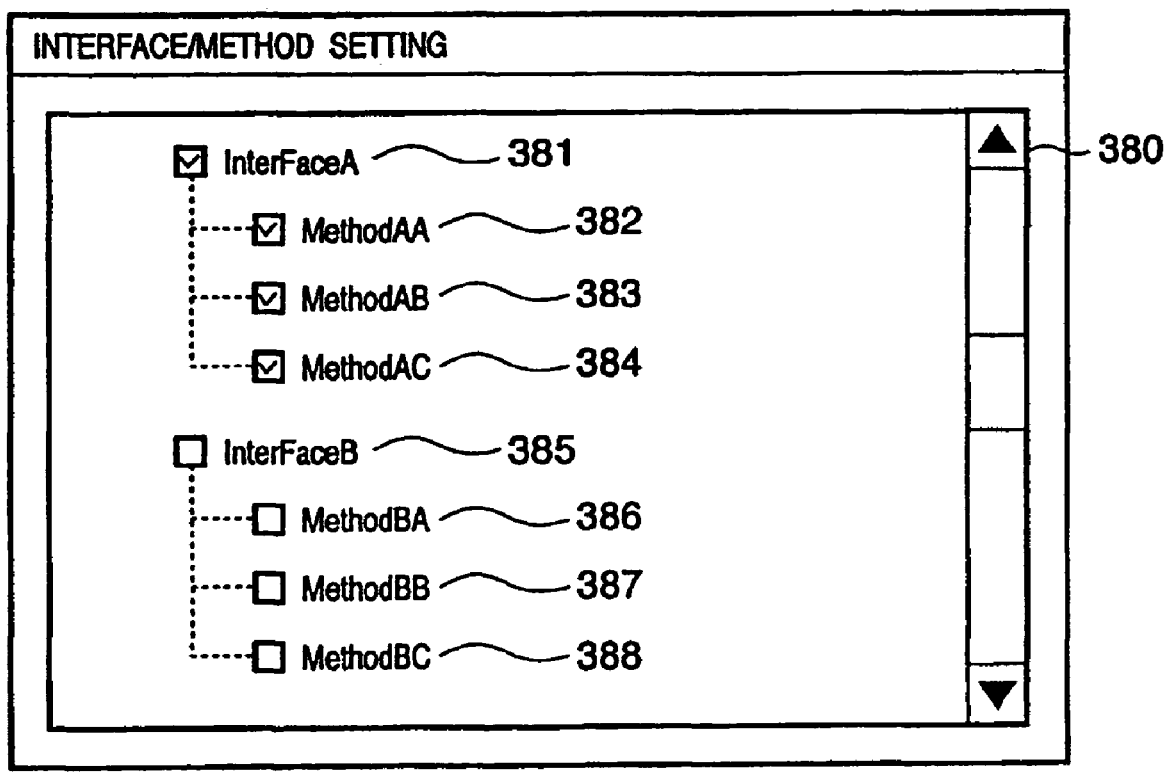
FIG. 28 shows a user interface displaying a tree view of interfaces and methods according to a seventh embodiment.

FIG. 28 shows a user interface that provides a tree view of interfaces and methods according to a seventh embodiment.

The user interface has a view (380) for displaying interfaces and methods in tree form. When a user checks an interface, InterfaceA (381), all methods MethodAA, Method AB, and Method AC (382-384) in the interface are selected as targets for log acquisition. When the user unchecks an interface InterfaceB (385), all method MethodBA, MethodBB, and Method BC (385-388) in the interface are deselected and excluded from the target for log acquisition.

Figure 29:
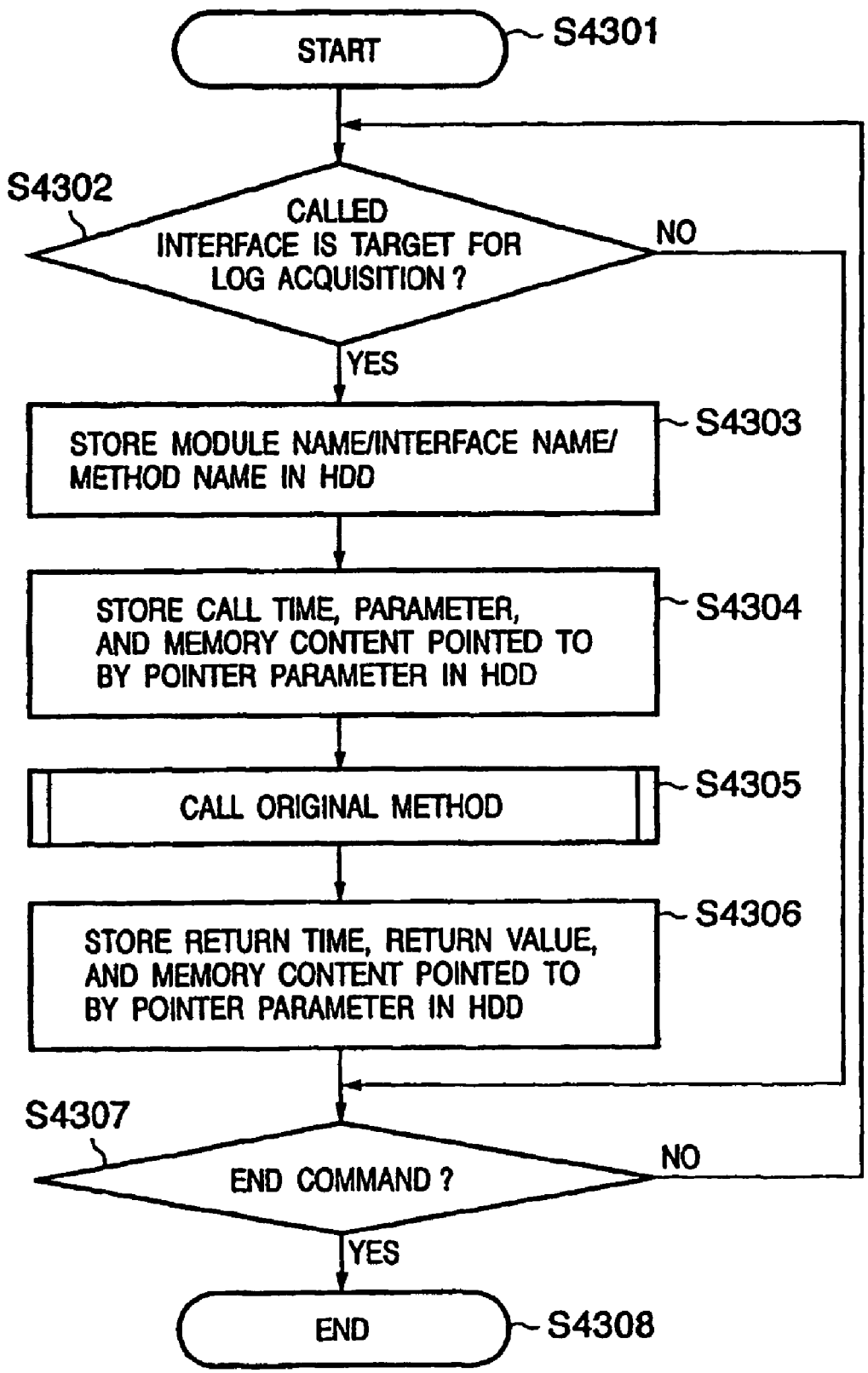
FIG. 29 shows a flowchart of a process for acquiring a log according to the seventh embodiment.

FIG. 29 shows a flowchart of a process for acquiring a log in the software evaluation system according to the seventh embodiment when targets for log acquisition are selected as shown in FIG. 28.

Once the process has been started (step S4301), the log acquisition code determines, each time a call to a method in an interface is made, whether or not the interface associated with the method is a target for log acquisition (step 4302). If it is a target for log acquisition, then the log acquisition code stores the module name, interface name, and method name in the HDD (step S4303) Then the log acquisition code stores the call time, parameter, memory content pointed to by a pointer parameter in the HDD (step S4304) and calls the original method (step 34305). After returning from the method, the log acquisition code stores the return time, return value, and memory content pointed to by the pointer parameter in the HDD (step S4306). The process continues until an end command is provided by the user (step 34307). Thus, the user can more readily know the relationship between interfaces and methods and readily selects an interface to obtain its log, thereby facilitating acquisition of the desired log.

Eighth Embodiment

While all the method in an interface are selected in the fourth to seventh embodiments, individual method(s) may be independently selected.

Figure 30:
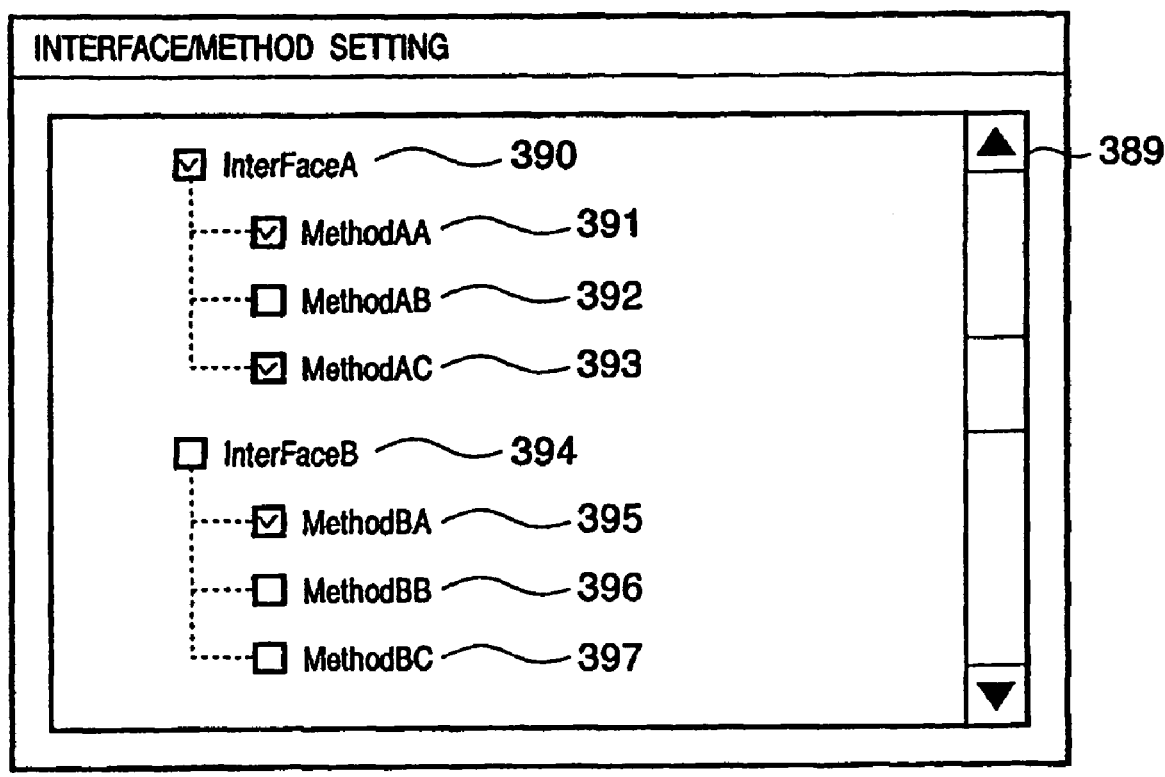
FIG. 30 shows a user interface displaying a tree view of interfaces and methods according to an eighth embodiment.

FIG. 30 shows a user interface that provides a tree view of interfaces and methods according to an eighth embodiment. This user interface is the same as the one shown in FIG. 28 but the method for selecting from among them is different.

The user interface includes a view (389) for displaying interfaces and methods in tree form. A user can check any of the methods MethodAA (391), MethodAC (393), MethodBA (395), and uncheck any of the methods MethodAB (392), MethodBB (396), Method BC (397) to select only one or more methods that are left checked in interfaces InterfaceA (210), InterfaceB (394) as targets of log acquisition, rather than all the methods in each interfaces.

Figure 31:
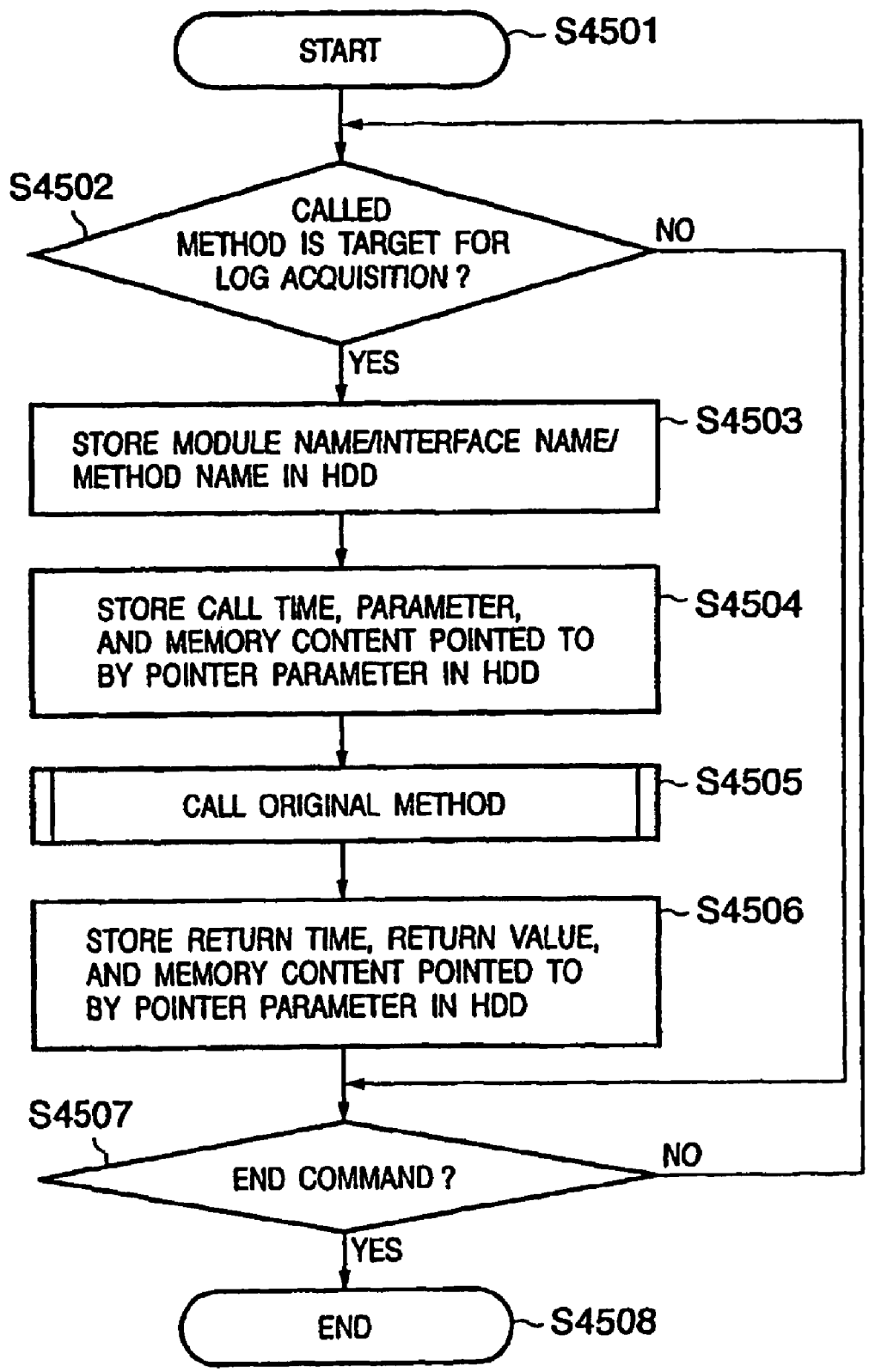
FIG. 31 shows a flowchart of a process for acquiring a log according to the eighth embodiment.

FIG. 31 shows a flowchart of a process for acquiring a log in the software evaluation system according to the eighth embodiment when targets of log acquisition are selected as shown in FIG. 30.

Once the process has been started (step S4501), the log acquisition code determines, each time a call to a method in an interface is made, whether or not any of the methods associated with the interface are targets for log acquisition (step S4502). If it any of them are targets for log acquisition, then the log acquisition code stores the module name, interface name, and method name(s) in the HDD (step S4503). The process (step S4504 to S4507) is the same as the one shown in FIG. 33 according to the seventh embodiment.

Thus, this embodiment provides the advantage that the user can readily select an individual method or methods to acquire the log of them, rather than an interface, which is a larger unit. Consequently, the user can readily acquire his/her desired log.

Ninth Embodiment

While an acquired log is stored in a given location in the HDD in the embodiments described above, a log may be stored on a date-by-date basis in order to facilitate log analysis.

Figure 32:
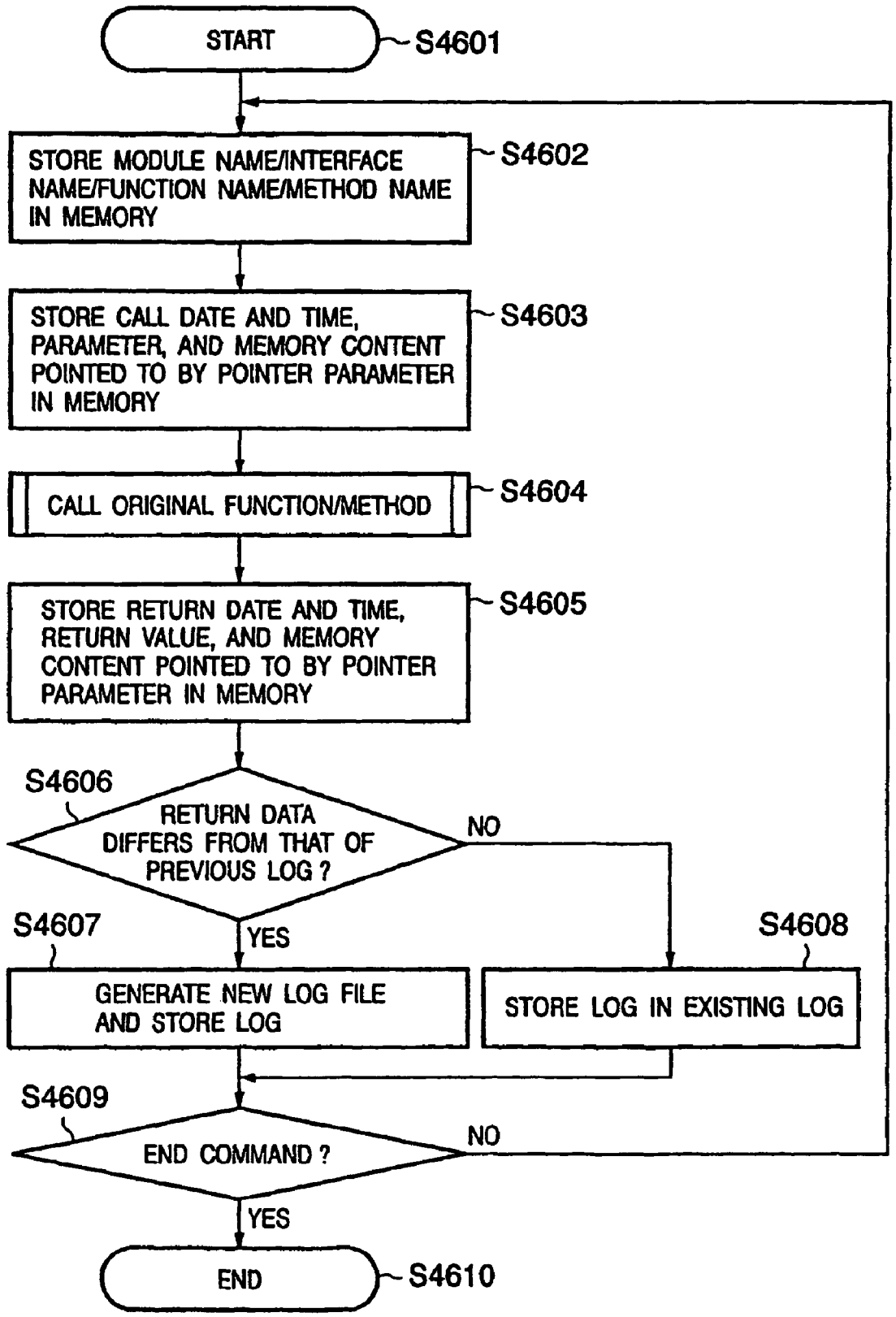
FIG. 32 shows a flowchart of a process for dividing and storing a log on a date-by-date basis according to a ninth embodiment.

FIG. 32 shows a flowchart of a process for storing logs separated on a date-by-date basis.

When the process is started (step S4601), log acquisition is initiated and the module name, interface name, function/method name are stored in memory (step S4602)

The log acquisition code then stores the call date and time, parameter, and a memory content pointed to by a pointer in memory (step S4603) and calls the original function/method (step S4604). After returning from the function/method, the log acquisition code return date and time, return value, memory content pointed to by the pointer parameter in memory (step S4605). Then it determines whether or not the date of the return of the called function/method differs from the return date previously stored (step S4606). If the date differs from the previous return date, the log acquisition code generates a new log file and stores the log in that file (step S4607). On the other hand, if they are the same, the log acquisition code stores the log in the existing log file (step S4608). This process end (S4610) when an end command is provided by the user (step S4609).

Thus, this embodiment provides the advantage that it allows the user to acquire logs on a date-by-date basis, thereby facilitating log analysis.

Tenth Embodiment

While logs are stored on a date-by-date basis in the ninth embodiment described above, logs can be stored separately according to the size or number of the logs.

Figure 33:
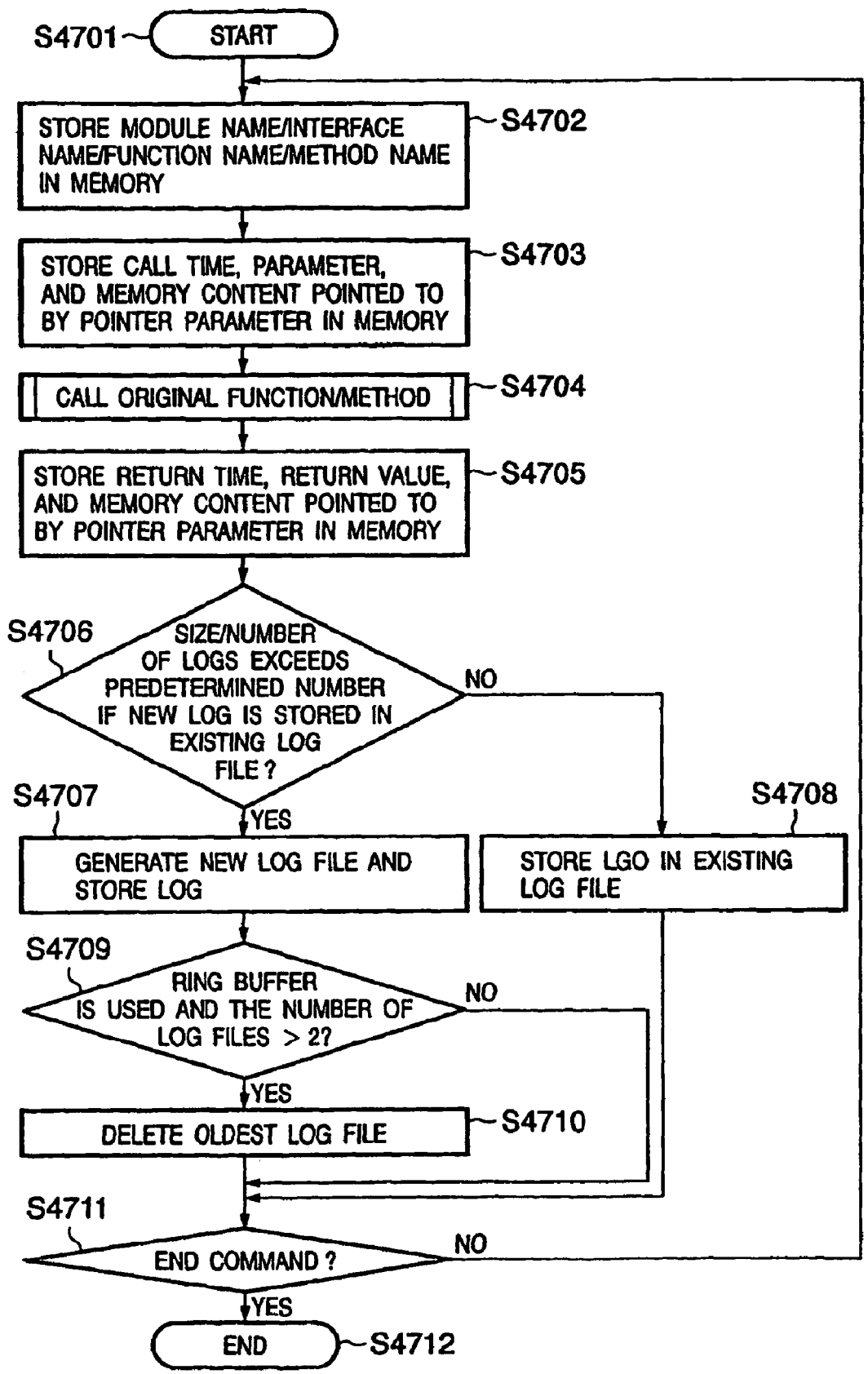
FIG. 33 shows a flowchart of a process for dividing and storing a log according to the size or number of log files according to a tenth embodiment.

FIG. 33 shows a flowchart of a process for separately storing logs according to the size or the number of the logs.

When the process is started (step S4701), log acquisition starts and the module name, interface name, and function/method name are stored in memory (step S4702). The log acquisition code then stores the call time, parameter, and the memory content pointed to by a pointer parameter in memory (step S4703) and calls the original function/method (step S4704). After returning from the function/method, the log acquisition code stores the return time, the return value, and the memory content pointed to by the pointer parameter in memory (step S4705). Then it determines whether storing the new log data in an existing log file causes the size of the file or the number of logs in the file to exceed to a predetermined value (step 34706).

If the size or the number of the logs exceeds the predetermined value, the log acquisition code generates a new log file and stores the log in that file (step 34707). Otherwise, if not exceed it stores the log in the existing log file (step S4708). If the log acquisition code generates a new log file, it determines whether or not a ring buffer is used and the number of log files generated is more than two (step S4709). If so, it deletes the oldest log file (step 4710). This process ends (step S4712) when an end command is provided from the user (step S4711).

Thus, the user can acquire size-controlled, generated files and a predetermined number of generated logs. The present embodiment therefore has the advantage that it provides more manageable logs. Furthermore, using a ring buffer can limit the load placed by the software evaluation system on the resources of the PC, enabling stable log acquisition.

Eleventh Embodiment

Figure 34:
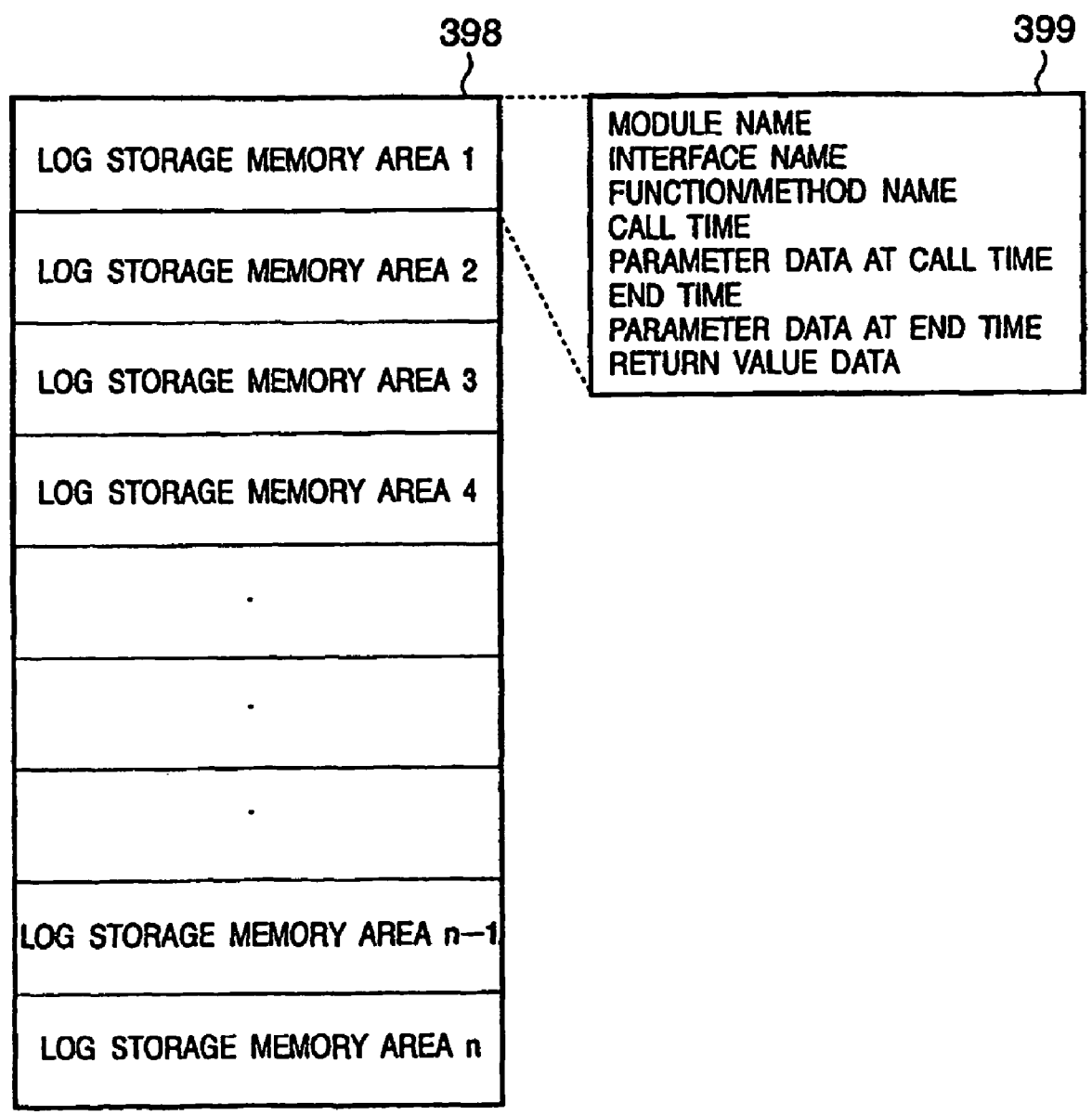
FIG. 34 schematically shows memory storing a predetermined number of logs from among the logs obtained in according to a eleventh embodiment.

FIG. 34 schematically shows memory in which a predetermined number of acquired logs are stored.

N log storage areas (398) are provided for storing a predetermined number of logs. Each log storage area stores a log of functions/methods. The information is stored includes the module name, interface name, function/method name, call time, parameter data at the call time, the end time, parameter data at the end time, and return value data (399). The information has a variable size. Log data is stored in the memory areas in order, from log storage memory area l to log storage memory area n. When the areas are exhausted, the logs are overwritten, starting from log storage memory are 1.

Figure 35:
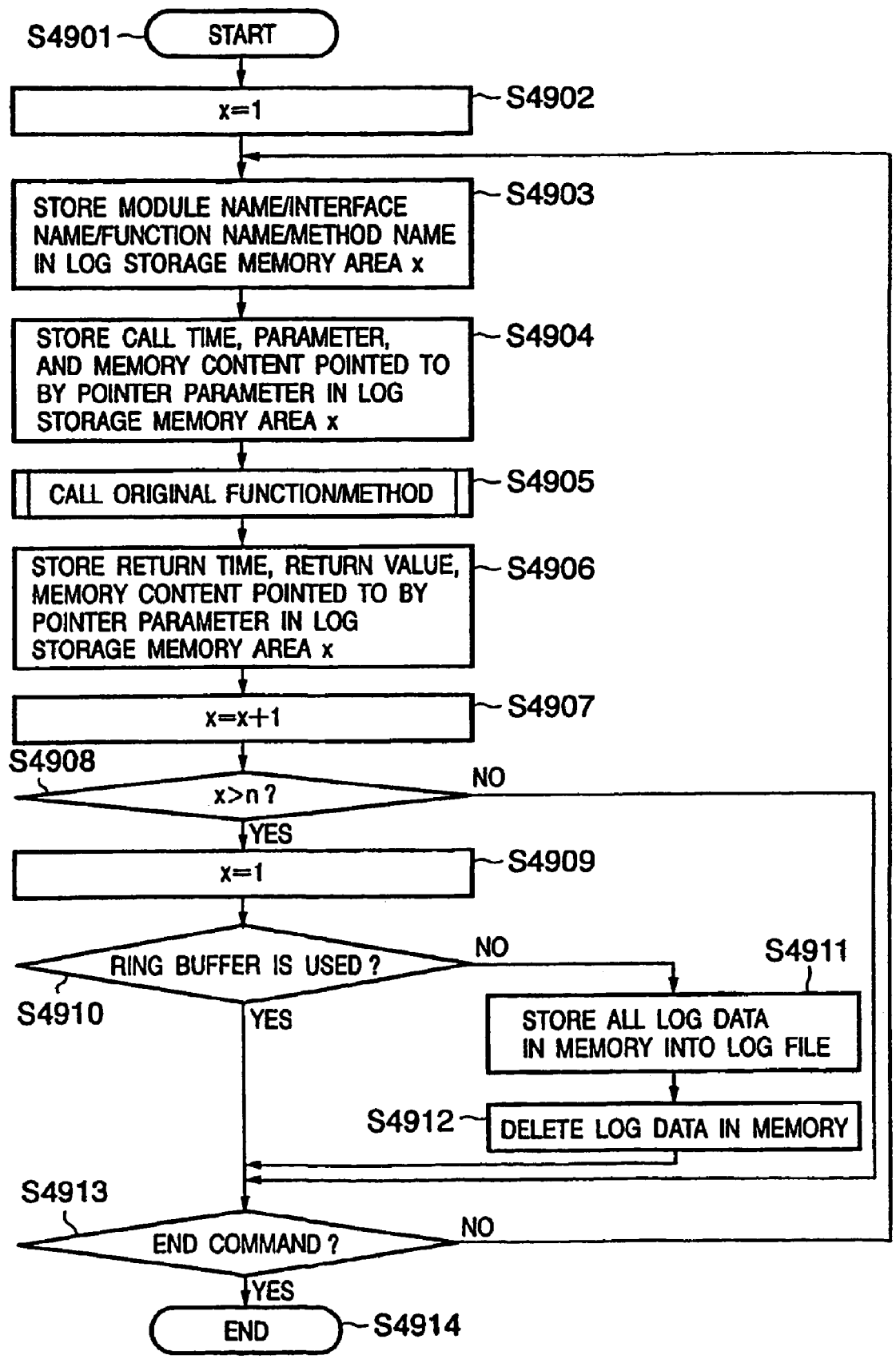
FIG. 35 shows a flowchart of a process for acquiring the predetermined number of logs from among the logs obtained according to the eleventh embodiment.

FIG. 35 shows a flowchart of a process for acquiring logs and storing a predetermined number of acquired logs in the memory.

When the process is started (step S4901), a variable x indicating the location of a log storage area is initialized to 1 (step S4902). Then log acquisition is started and the module name, interface name, function/method name are stored in the log storage memory area x (step S4903).

The log acquisition code then stores the call time, a parameter, and the memory content pointed to by a pointer parameter in log storage memory area x (step 34904) and calls the original method/function (step S4905). After returning from the function/method, the log acquisition code stores the return time, the return value, and the memory content pointed to by the pointer parameter in log storage memory area x (step S4906).

Then it adds 1 to the variable x that indicates the location of a log storage memory area (step S4907) and determines whether x exceeds the number n of the log storage memory areas (step S4908).

If x is larger than n, it assigns 1 to x so that the log storage memory areas are reused from the top log storage memory area (step S4909). Then it determines whether or not a ring buffer is to be used (step S4910). If not, the log acquisition code stores all log data in the memory into a log file (step S4911) and deletes all the log data from the memory (step S4912). This process ends (step S4914) when an end command is provided from the user (step S4913).

Thus, memory usage can be limited ad load placed by the software evaluation system on the resources of the PC can be minimized, enabling stable log acquisition.

Other Embodiments

The present invention may be applied to a system consisting of a plurality of devices (for example, a host computer, interface devices, a reader, and a printer) or a standalone apparatus (for example a copying machine or facsimile machine.

The object of the present invention can also be achieved by providing a storage medium containing a program code of software that implements the functions of the embodiments described above to a system or an apparatus and causes to a computer (or CPU or MPU) of the system or the apparatus to read and execute the program code stored on the storage medium.

In that case, the program code read from the storage medium implements the functions of the embodiments described above and the storage medium on which the program code is stored constitutes the present invention.

The storage medium for providing the program code may be a floppy® disk, disk, hard disk, optical disk, magneto-optical disk, CD-ROM, CD-R, magnetic tape, nonvolatile memory card, or RON.

The present invention includes not only implementations in which the features of the embodiments described above are implemented by a computer reading and executing the program code but also implementations in which an OS (operating system) or the like running on a computer executes all or part of the actual processing to implement the features of the embodiments described above according to instructions in the program code.

Furthermore, the present invention includes cases where the program code read from the storage medium is written into an expansion board inserted into a computer or memory provided in a expansion unit connected to a computer and a CPU or other processor provided in the expansion board or expansion unit executes all or part of the actual processing and the processing implements the features of the embodiments described above.

As described above, the present invention allows processing logs of software divided into a plurality of modules to be readily acquired and reduces the man-hours need to analyze the cause of software failure.

As many apparently widely different embodiments of the present invention can be made without departing from the spirit and scope thereof, it is to be understood that the invention is not limited to the specific embodiments thereof except as defined in the claims.

What is claimed is:

1. A log acquisition method for acquiring a runtime log of a program including at least one function for performing a predetermined process, the method comprising:
changing an address of the at least one function loaded for performing the predetermined process to an address of a function for log acquisition,
wherein the function for log acquisition includes steps of:
calling the at least one function for performing the predetermined process to cause the predetermined process to be executed, receiving an execution result, and passing the execution result to the program;
determining whether or not a pointer parameter, a type of which is specified by an index structure, is defined in a function definition in the program, and judging the type of the pointer parameter by referring to its type specified by the index structure; and
if the pointer parameter, the type of which is specified by the index structure, is defined, recording a memory content pointed to by the pointer parameter as data of a specified data type.

2. The log acquisition method according to claim 1, wherein types of at least some members of the index structure are various kinds of unexported functions.

3. The log acquisition method according to claim 1, wherein types of at least some members of the index structure are various kinds of structures.

4. A log acquisition method for acquiring a runtime log of a program including at least one function for performing a predetermined process, the method comprising:
changing an address of the at least one function loaded for performing the predetermined process to an address of a function for log acquisition,
wherein the function for log acquisition includes steps of:
calling the at least one function for performing the predetermined process to cause the predetermined process to be executed, receiving an execution result, and passing the execution result to the program;
determining whether or not a pointer parameter, a type of which is specified in a predetermined manner, is defined in a function definition in the program;
calculating memory size according to the definition; and
if the pointer parameter, the type of which is specified in the predetermined manner, is defined, recording a memory content pointed to by the pointer parameter as data of a specified data type and an amount of the memory content pointed to by the pointer parameter, the amount being equal to the calculated memory size.

5. A log acquisition method for acquiring a runtime log of a program including at least one function for performing a predetermined process, the method comprising steps of:
changing an address of the at least one function loaded for performing the predetermined process to an address of a function for log acquisition; and
selecting at least one function for log acquisition,
wherein the at least one function for log acquisition includes steps of:
calling the at least one function for performing the predetermined process to cause the predetermined process to be executed, receiving an execution result, and passing the execution result to the program;
determining whether or not a pointer parameter, a type of which is specified in a predetermined manner, is defined in a function definition in the program; and
if the pointer parameter, the type of which is specified in a predetermined manner, is defined, recording a memory content pointed to by the pointer parameter as data of a specified data type.

6. A log acquisition method for acquiring a runtime log of a program including at least one function for performing a predetermined process, the method comprising steps of:
changing an address of the at least one function loaded for performing the predetermined process to an address of a function for log acquisition; and
selecting at least one function for stopping log recording,
wherein the function for log acquisition includes steps of:
calling the at least one function for performing the predetermined process to cause the predetermined process to be executed, receiving an execution result, and passing the execution result to the program;
determining whether or not a pointer parameter, a type of which is specified in a predetermined manner, is defined in a function definition in the program; and
if the pointer parameter, the type of which is specified in the predetermined manner, is defined, recording a memory content pointed to by the pointer parameter as data of a specified data type; and
stopping log recording after recording based on the at least one function for stopping log recording.

7. The log acquisition method according to claim 5, wherein the at least one function for log acquisition further includes a step of determining whether or not an error has occurred during execution of the at least one function selected in the selecting step, and the recording step is started if it is determined that an error has occurred.

8. The log acquisition method according to claim 6, wherein the function for log acquisition further includes a step of determining whether or nor an error has occurred during execution of the at least one function selected in the selecting step, and the step of stopping log recording stops log recording if it is determined that an error has occurred.

9. The log acquisition method according to claim 5, the method further comprising a step of displaying an interface exported by a COM server and functions belonging to the interface in a tree form, wherein the selecting step is performed via the displayed interface.

10. The log acquisition method according to claim 6, the method further comprising a step of displaying an interface exported by a COM server and functions belonging to the interface in a tree form, wherein the selecting step is performed via the displayed interface.

11. The log acquisition method according to claim 9, wherein the selecting step is performed on a function-by-function basis.

12. The log acquisition method according to claim 10, wherein the selecting step is performed on a function-by-function basis.

13. The log acquisition method according to claim 9, wherein the selecting step includes selecting all the functions belonging to the interface by selecting interface.

14. The log acquisition method according to claim 10, wherein the selecting step includes selecting all the functions belonging to the interface by selecting the interface.

15. The log acquisition method according to claim 5, wherein the recording step records to the log on a date-by-date basis.

16. The log acquisition method according to claim 5, wherein the recording step generates a new file when a size of the log exceeds a predetermined size.

17. The log acquisition method according to claim 5, wherein the recording step generates a new file when a number of logs exceeds a predetermined number.

18. The log acquisition method according to claim 5, wherein the recording step moves and stores the log into a disk device when a number of logs in the memory exceeds a predetermined number.

19. A storing medium storing a control program for causing a computer to implement a log acquisition method for acquiring a runtime log of a program including at least one function for performing a predetermined process, the method comprising:

changing an address of the at least one function loaded for performing the predetermined process to an address of a function for log acquisition, wherein the function for log acquisition includes steps of:

calling the at least one function for performing the predetermined process to cause the predetermined process to be executed, receiving an execution result, and passing the execution result to the program;

determining whether or not a pointer parameter, a type of which is specified by an index structure, is defined in a function definition in the program, and judging the type of the pointer parameter by referring to its type specified by the index structure; and if the pointer parameter, the type of which is specified by the index structure, is defined, recording a memory content pointed to by the pointer parameter as data of a specified data type.

20. A storing medium storing a control program for causing a computer to implement a log acquisition method for acquiring a runtime log of a program including at least one function for performing a predetermined process, the method comprising:

changing an address of the at least one function loaded for performing the predetermined process to an address of a function for log acquisition, wherein the function for log acquisition includes steps of:

calling the at least one function for performing the predetermined process to cause the predetermined process to be executed, receiving an execution result, and passing the execution result to the program;

determining whether or not a pointer parameter, a type of which is specified in a predetermined manner, is defined in a function definition in the program;

calculating memory size according to the definition; and if the pointer parameter, the type of which is specified in the predetermined manner, is defined, recording a memory content pointed to by the pointer parameter as data of a specified data type and an amount of the memory content pointed to by the pointer parameter, the amount being equal to the calculated memory size.

21. A storing medium storing a control program for causing a computer to implement a log acquisition method for acquiring a runtime log of a program including at least one function for performing a predetermined process, the method comprising steps of:

changing an address of the at least one function loaded for performing the predetermined process to an address of a function for log acquisition; and selecting at least one function for log acquisition, wherein the at least one function for log acquisition includes steps of:

calling the at least one function for performing the predetermined process to cause the predetermined process to be executed, receiving an execution result, and passing the execution result to the program;

determining whether or not a pointer parameter, a type of which is specified in a predetermined manner, is defined in a function definition in the program; and if the pointer parameter, the type of which is specified in a predetermined manner, is defined, recording a memory content pointed to by the pointer parameter as data of a specified data type.

22. A storing medium storing a control program for causing a computer to implement a log acquisition method for acquiring a runtime log of a program including at least one function for performing a predetermined process, the method comprising steps of:

changing an address of the at least one function loaded for performing the predetermined process to an address of a function for log acquisition; and selecting at least one function for stopping log recording, wherein the function for log acquisition includes steps of:

calling the at least one function for performing the predetermined process to cause the predetermined process to be executed, receiving an execution result, and passing the execution result to the program;

determining whether or not a pointer parameter, a type of which is specified in a predetermined manner, is defined in a function definition in the program; and if the pointer parameter, the type of which is specified in the predetermined manner, is defined, recording a memory content pointed to by the pointer parameter as data of a specified data type; and stopping log recording after recording based on the at least one function for stopping log recording.

* * * * *

UNITED STATES PATENT AND TRADEMARK OFFICE
CERTIFICATE OF CORRECTION

PATENT NO.      : 7,426,660 B2
APPLICATION NO. : 11/022951
DATED           : September 16, 2008
INVENTOR(S)     : Xinxia Chen et al.

It is certified that error appears in the above-identified patent and that said Letters Patent is hereby corrected as shown below:

ON THE TITLE PAGE ITEM [30]:

Foreign Application Priority Data, "2003 1 0124566" should read --2003 1 0124566.7--.

ON THE TITLE PAGE ITEM [57] ABSTRACT:

Line 16, "may defined" should read --may be defined--.

SHEET 35:

Figure 33, "LGO" should read --LOG--.

COLUMN 1:

Line 55, "of the type" should read --the type--.

COLUMN 2:

Line 31, "acquiring log" should read --acquiring a log--; and
Line 60, "an fifth" should read --a fifth--.

COLUMN 3:

Line 24, "obtained in" should read --obtained--; and
Line 25, "a eleventh" should read --an eleventh--.

COLUMN 5:

Line 11, "when an instance" should read --in an instance--;
Line 18, "programming)" should read --programming--;
Line 24, "to issues" should read --to issue--;
Line 27, "and uses" should read --and uses methods in--;
Line 28, "¶ methods" should read --methods--, and "interface." should read --interfaces.--; and
Line 38, "embodiment" should read --embodiment.--.

COLUMN 6:

Line 3, "write" should read --writes--.

COLUMN 7:

Line 31, "funckind—is" should read --funckind_is--; and
Line 64, "STRUICTKIND3" should read --STRUCTKIND3--.

COLUMN 8:

Line 50, "(structkin-" should read --(struct- --; and
Line 51, "d_is" should read --kind_is--.

COLUMN 9:

Line 5, "in a fourth" should read --is described in a fourth--;
Line 20, "(step S34 02)." should read --step S3402).--;
Line 33, "forgoing" should read --foregoing--; and
Line 43, "an fifth" should read --a fifth--.

COLUMN 10:

Line 4, "process end" should read --process ends--; and
Line 31, "the—function/method" should read --the function/method--.

COLUMN 11:

Line 10, "(step 34003)" should read --(step S4003)--; and
Line 44, "acquired" should read --acquire--.

COLUMN 12:

Line 4, "(step S4303)" should read --(step S4303).--;
Line 7, "(step 34305)." should read --(step S4305).--;
Line 11, "(step 34307)." should read --(step S4307).--;
Line 18, "method" should read --methods--;
Line 32, "interfaces." should read --interface.--;
Line 41, "if it any" should read --if any--; and
Line 62, "(step S4602)" should read --(step S4602).--.

COLUMN 13:

Line 36, "if not" should read --if it does not--;
Line 57, "is stored" should read --that is stored--; and
Line 64, "memory are 1." should read --memory area 1.--.

CERTIFICATE OF CORRECTION (continued)
U.S. Pat. No. 7,426,660 B2

COLUMN 14:

Line 8, "(step 34904)" should read --(step S4904)--;
Line 26, "ad load" should read --and load--;
Line 34, "standalone" should read --stand-alone--;
Line 36, "machine." should read --machine).--;
Line 40, "causes to a" should read --causes a--; and
Line 63, "a expansion" should read --an expansion--.

COLUMN 16:

Line 41, "whether or nor" should read --whether or not--; and
Line 64, "interface." should read --the interface.--.

Signed and Sealed this

Fifth Day of January, 2010

David J. Kappos
*Director of the United States Patent and Trademark Office*